United States Patent
Miura

(10) Patent No.: US 10,691,264 B2
(45) Date of Patent: *Jun. 23, 2020

(54) PROJECTION DISPLAY APPARATUS

(71) Applicant: SONY CORPORATION, Tokyo (JP)

(72) Inventor: Koji Miura, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/449,613

(22) Filed: Jun. 24, 2019

(65) Prior Publication Data

US 2019/0310740 A1 Oct. 10, 2019

Related U.S. Application Data

(63) Continuation of application No. 15/325,675, filed as application No. PCT/JP2015/067611 on Jun. 18, 2015, now Pat. No. 10,372,269.

(30) Foreign Application Priority Data

Jul. 29, 2014 (JP) .................................. 2014-153406

(51) Int. Cl.
*G06F 3/042* (2006.01)
*G03B 17/54* (2006.01)
(Continued)

(52) U.S. Cl.
CPC .......... *G06F 3/0425* (2013.01); *G03B 17/54* (2013.01); *G06F 3/0418* (2013.01);
(Continued)

(58) Field of Classification Search
CPC ... G06F 3/0425; G06F 3/0418; H04N 9/3164; H04N 9/3197; H04N 9/3179; H04N 9/3194; H04N 9/3155; G03B 17/54
(Continued)

(56) References Cited

U.S. PATENT DOCUMENTS 5,440,114 A 8/1995 Barbier et al.
10,372,269 B2* 8/2019 Miura .................... G06F 3/0425
(Continued)

FOREIGN PATENT DOCUMENTS

CA 2103314 A1 5/1994
CN 101846810 A 9/2010
(Continued)

OTHER PUBLICATIONS

Office Action for CN Patent Application No. 201580038955.9, dated Jul. 2, 2018, 03 pages of Office Action and 05 pages of English Translation.
(Continued)

*Primary Examiner* — Chineyere D Wills-Burns
(74) *Attorney, Agent, or Firm* — Chip Law Group

(57) ABSTRACT

A projection display apparatus includes a light valve that modulates illuminating light on the basis of image data to output the modulated light, an illuminating unit including a light source, and a plurality of optical members for illumination that generate the illuminating light on the basis of light from the light source to guide the illuminating light to the light valve, a projection lens that projects the modulated light from the light valve on a projection surface, and allows detection light to enter from a direction opposite to a travelling direction of the modulated light, and an imaging device that is disposed at a location optically conjugated with the light valve, and allows the detection light to enter through the projection lens. The plurality of optical members for illumination have optical property of reducing a noise component that affects the detection light and arises inside the illuminating unit.

19 Claims, 16 Drawing Sheets

(51) Int. Cl.
*G06F 3/041* (2006.01)
*H04N 9/31* (2006.01)

(52) U.S. Cl.
CPC ......... *H04N 9/3155* (2013.01); *H04N 9/3164* (2013.01); *H04N 9/3179* (2013.01); *H04N 9/3194* (2013.01); *H04N 9/3197* (2013.01)

(58) Field of Classification Search
USPC ....................................................... 345/175
See application file for complete search history.

(56) References Cited

U.S. PATENT DOCUMENTS

| | | | |
|---|---|---|---|
| 2002/0041361 A1* | 4/2002 | Tiao | G03B 21/005 353/31 |
| 2006/0289760 A1* | 12/2006 | Bathiche | G02B 5/282 250/332 |
| 2008/0051135 A1* | 2/2008 | Destain | G03B 17/54 455/556.1 |
| 2009/0262098 A1* | 10/2009 | Yamada | G06F 1/1616 345/175 |
| 2010/0245691 A1 | 9/2010 | Kawamura | |
| 2010/0296060 A1* | 11/2010 | Huang | G03B 21/142 353/20 |
| 2012/0075256 A1* | 3/2012 | Izadi | G06F 3/0421 345/175 |
| 2012/0116159 A1* | 5/2012 | Mizuyoshi | A61B 1/0653 600/109 |
| 2012/0256879 A1* | 10/2012 | Liu | G06F 3/0304 345/175 |
| 2012/0280941 A1* | 11/2012 | Hu | G03B 33/12 345/175 |
| 2012/0313910 A1* | 12/2012 | Haraguchi | H04N 9/3179 345/207 |
| 2013/0147711 A1* | 6/2013 | Njolstad | G06F 3/011 345/158 |
| 2013/0258294 A1* | 10/2013 | Kaneda | G02B 27/48 353/38 |
| 2014/0240293 A1* | 8/2014 | McCaughan | G06F 3/0304 345/175 |
| 2014/0240681 A1* | 8/2014 | Izukawa | G06F 3/0423 353/85 |
| 2015/0049308 A1* | 2/2015 | Mealing | G06F 3/0425 353/31 |

FOREIGN PATENT DOCUMENTS

| | | |
|---|---|---|
| EP | 598648 A1 | 5/1994 |
| FR | 2698194 A1 | 5/1994 |
| JP | 06-236236 A | 8/1994 |
| JP | 2001-343703 A | 12/2001 |
| JP | 2002-006397 A | 1/2002 |
| JP | 2005-148298 A | 6/2005 |
| JP | 2005-333460 A | 12/2005 |
| JP | 2010-230856 A | 10/2010 |
| JP | 2010-538685 A | 12/2010 |
| JP | 2011-180477 A | 9/2011 |
| JP | 2012-068364 A | 4/2012 |
| JP | 2012-208926 A | 10/2012 |
| JP | 2012-256000 A | 12/2012 |
| JP | 2013-003859 A | 1/2013 |
| JP | 2013-122501 A | 6/2013 |

OTHER PUBLICATIONS

International Search Report and Written Opinion of PCT Application No. PCT/JP2015/067611, dated Jul. 14, 2015, 08 pages of English Translation and 08 pages of ISRWO.
International Preliminary Report on Patentability of PCT Application No. PCT/JP2015/067611, dated Feb. 9, 2017, 08 pages of English Translation and 05 pages of IPRP.
Non-Final Office Action for U.S. Appl. No. 15/325,675, dated Jul. 23, 2018, 20 pages.
Notice of Allowance for U.S. Appl. No. 15/325,675, dated Jun. 25, 2019, 07 pages.
Notice of Allowance for U.S. Appl. No. 15/325,675, dated Mar. 21, 2019, 13 pages.
Notice of Allowance for U.S. Appl. No. 15/325,675, dated Dec. 18, 2018, 13 pages.
Office Action for JP Patent Application No. 2016-538216, dated Jun. 11, 2019, 07 pages of Office Action and 05 pages of English Translation.
Office Action for JP Patent Application No. 2016-538216, dated Dec. 10, 2019, 06 pages of Office Action and 05 pages of English Translation.

* cited by examiner

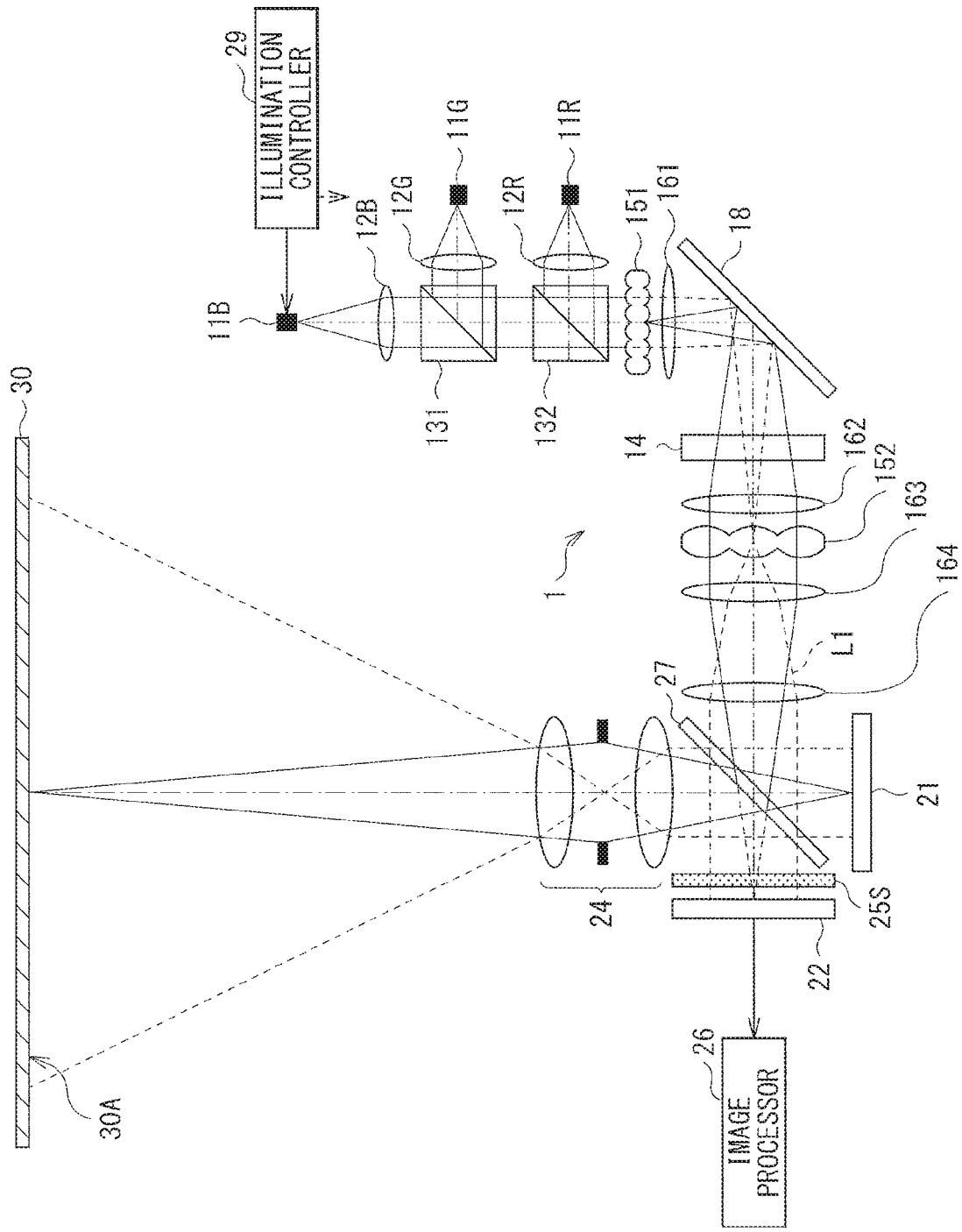
[FIG. 1]

[FIG. 2]
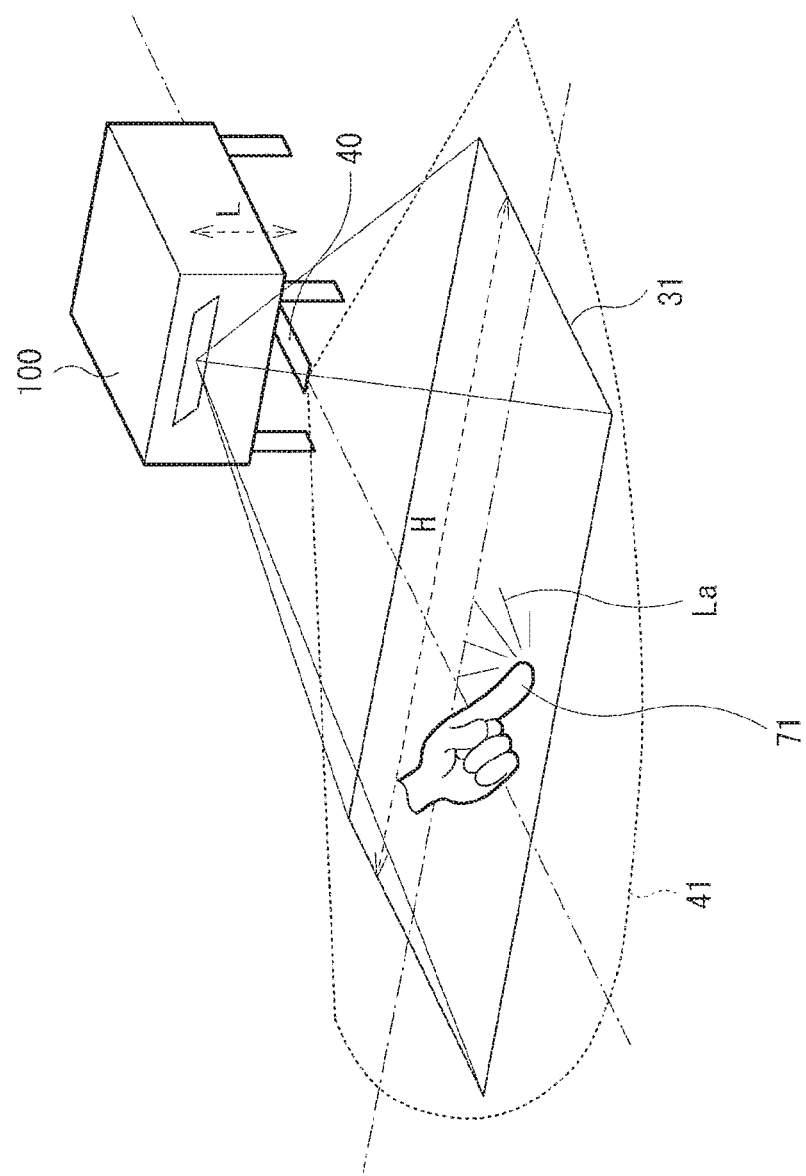

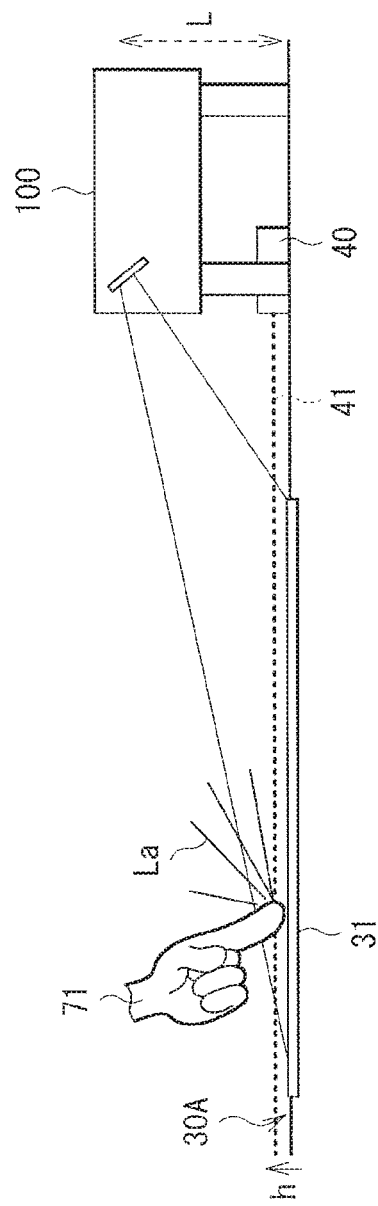

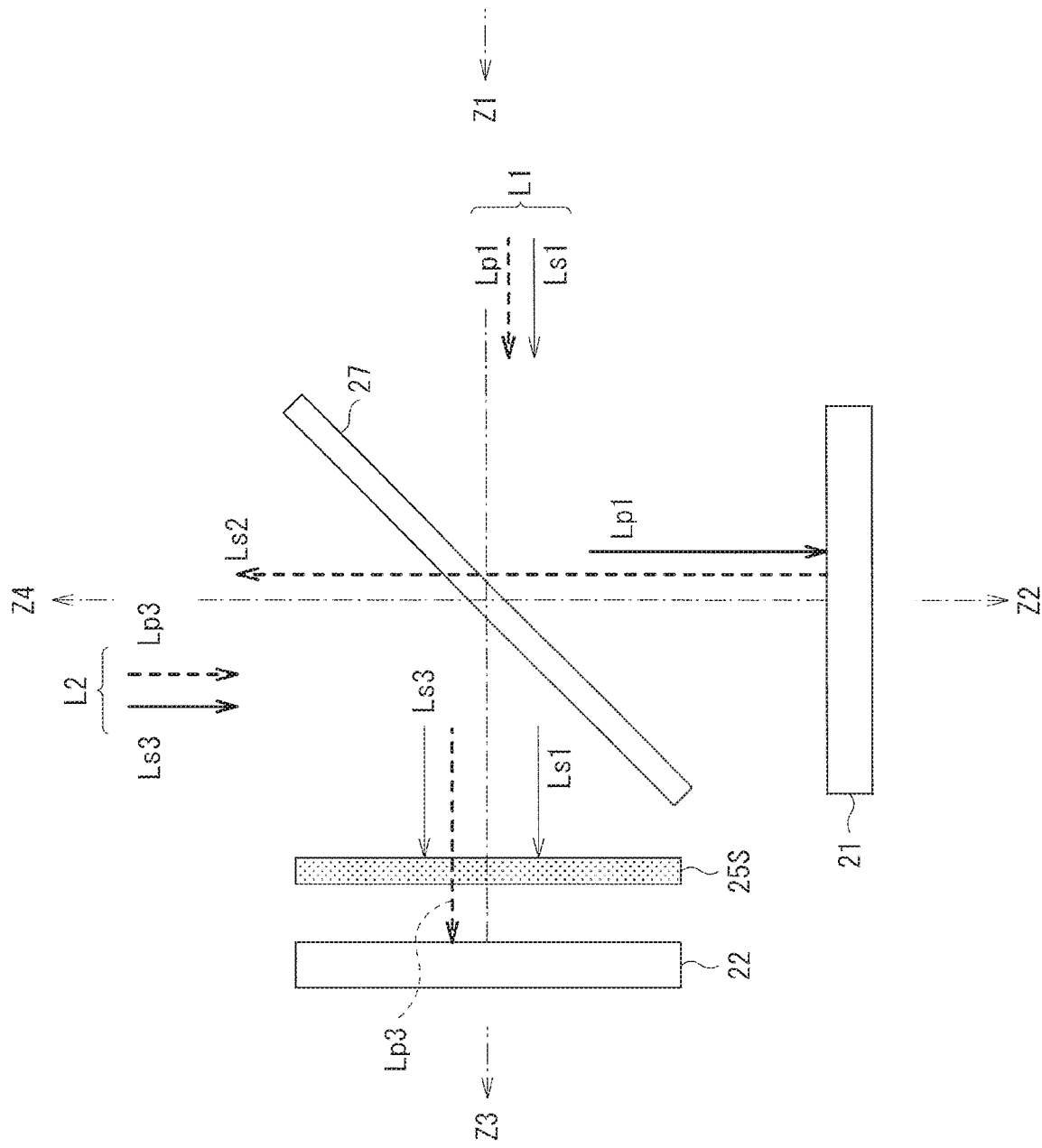
[FIG. 4]

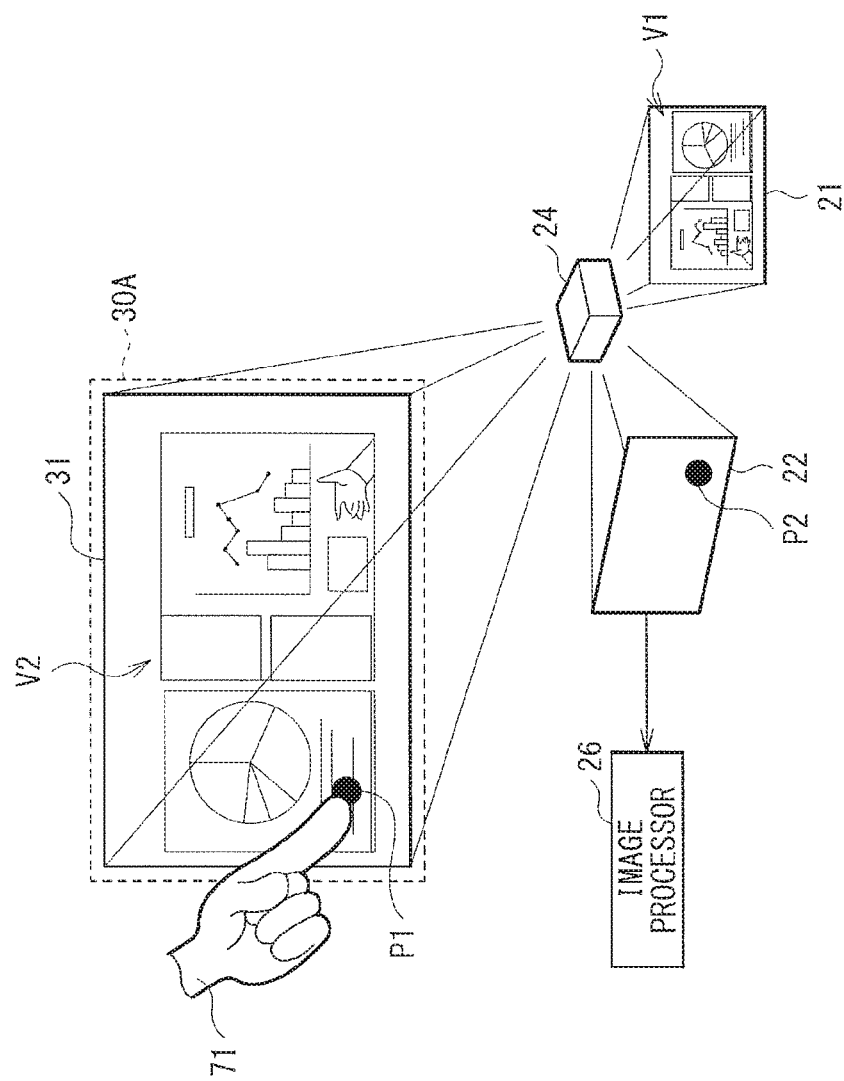
[FIG. 5]

[FIG. 6]
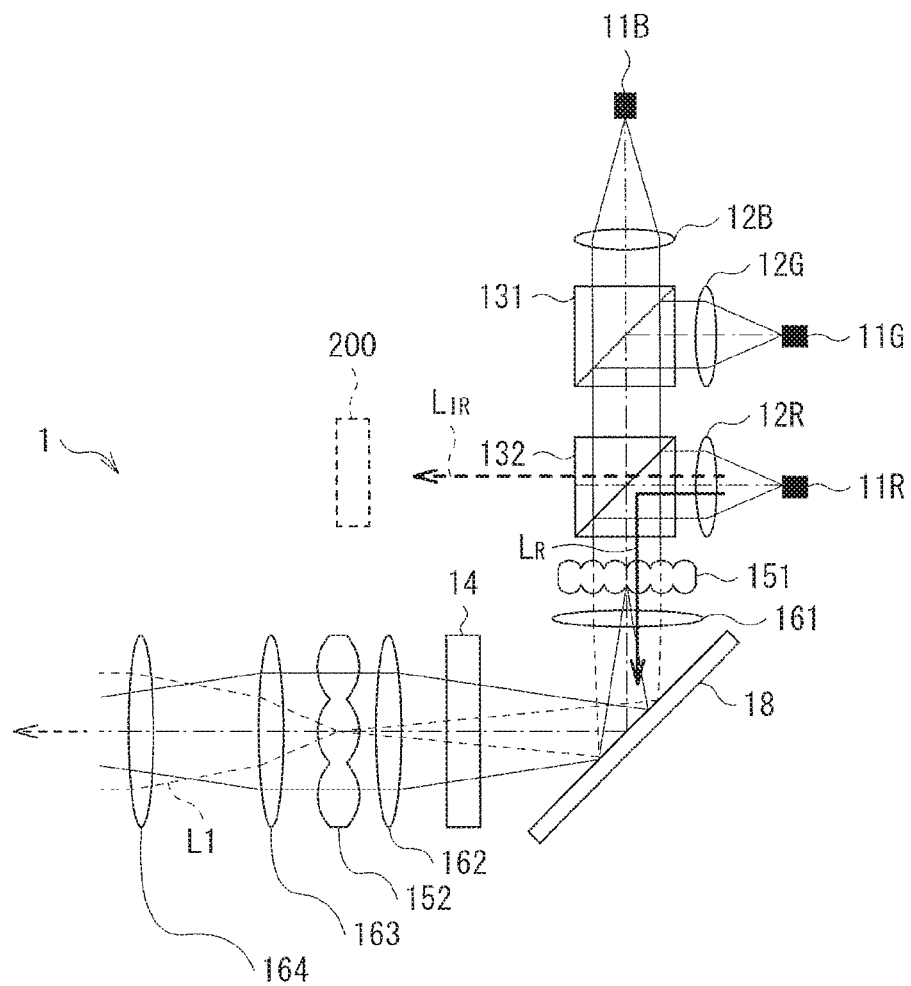

[FIG. 7]
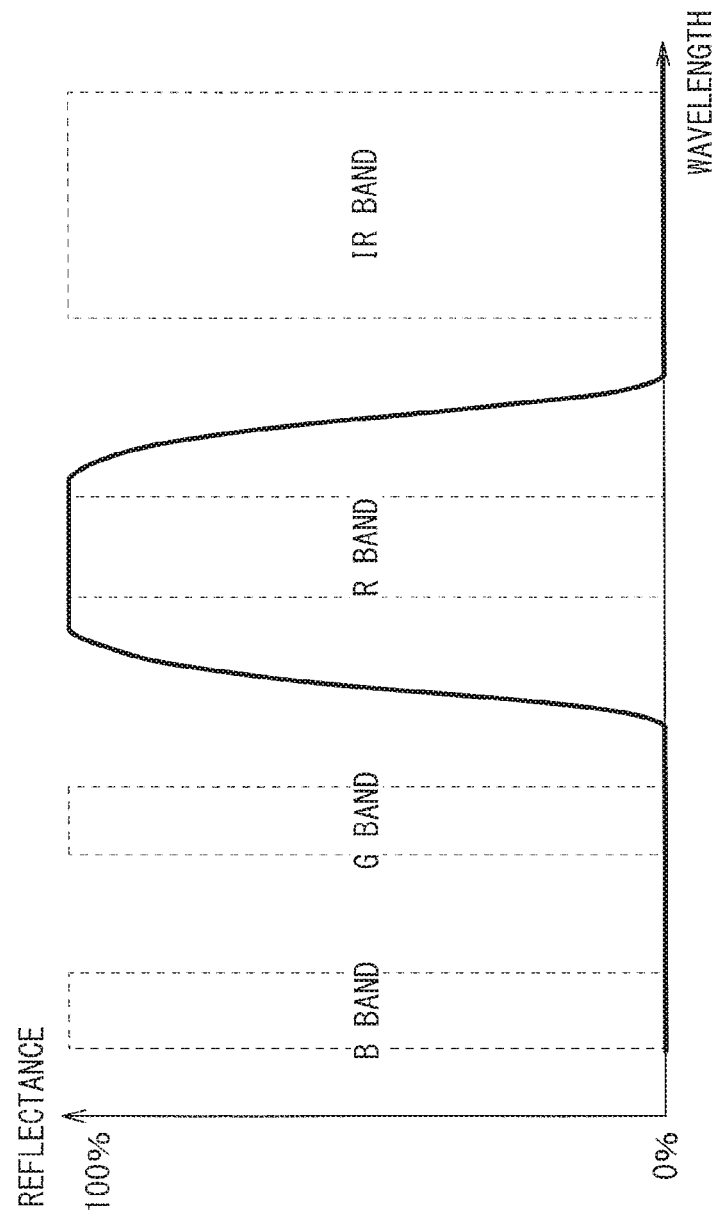

[FIG. 8]
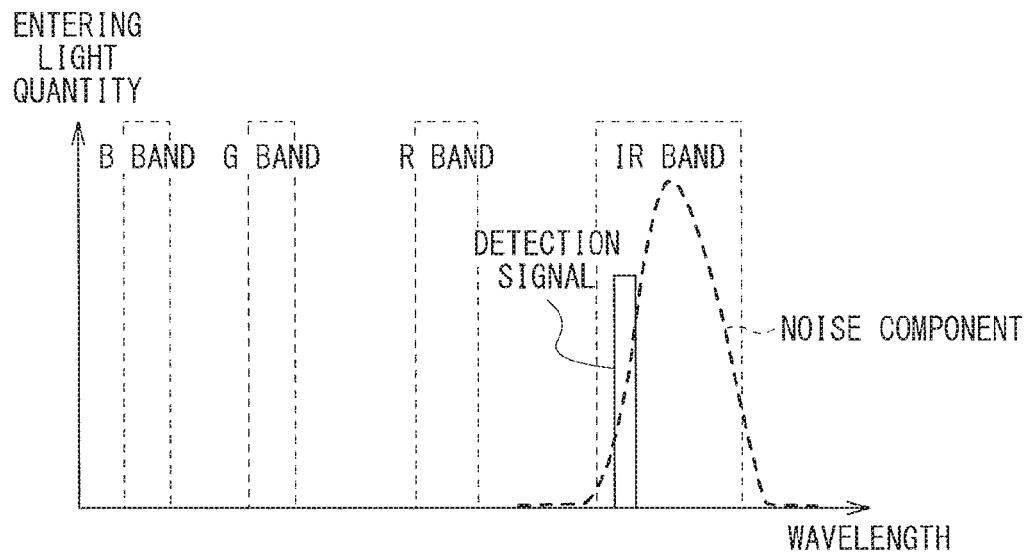
[FIG. 9]
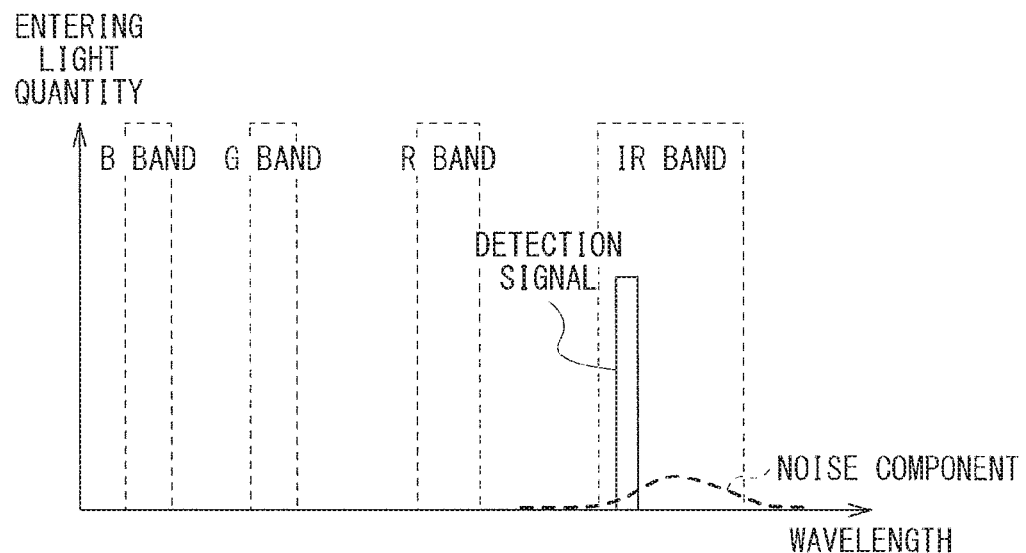

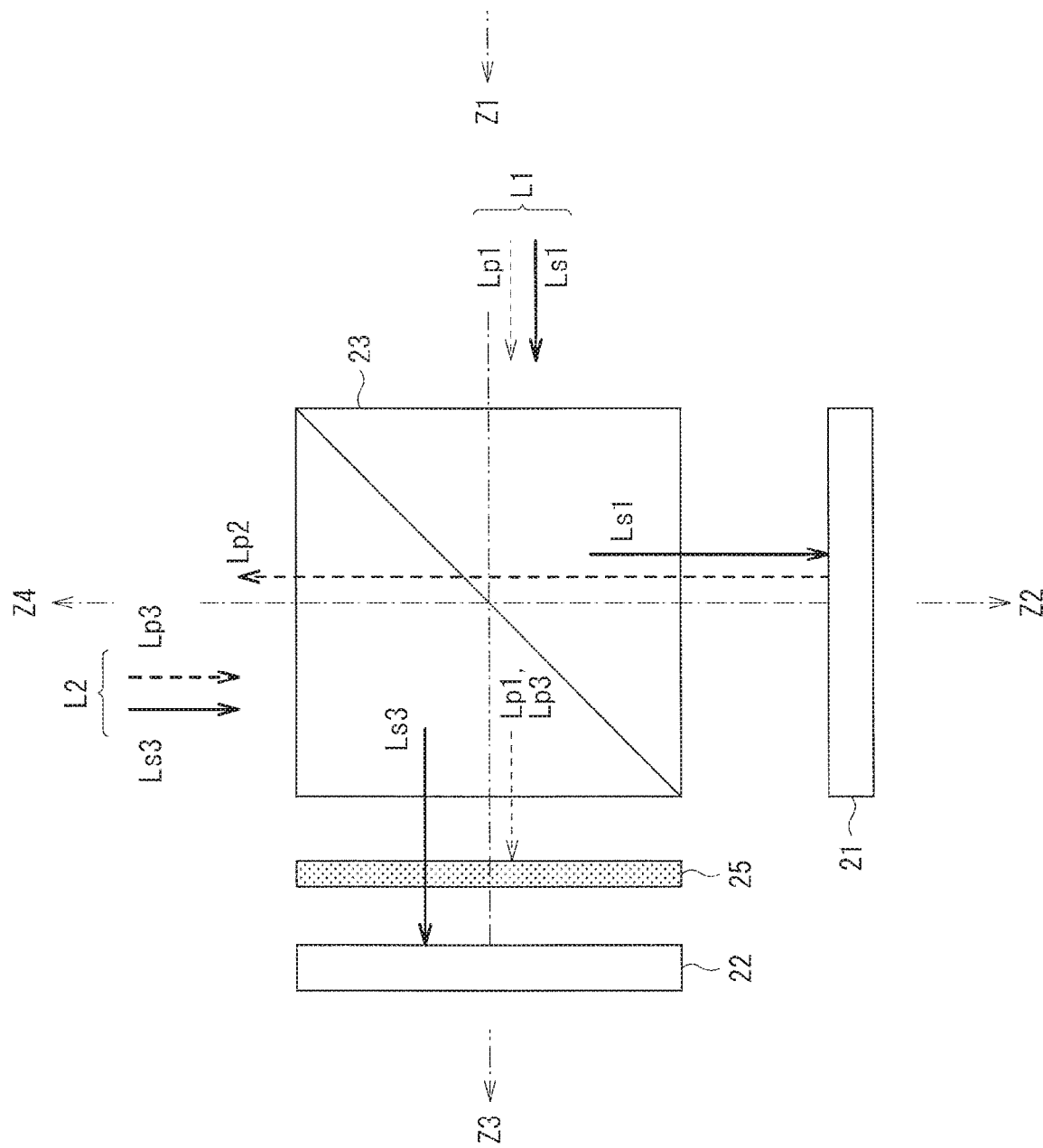
[FIG. 10]

[FIG. 11]
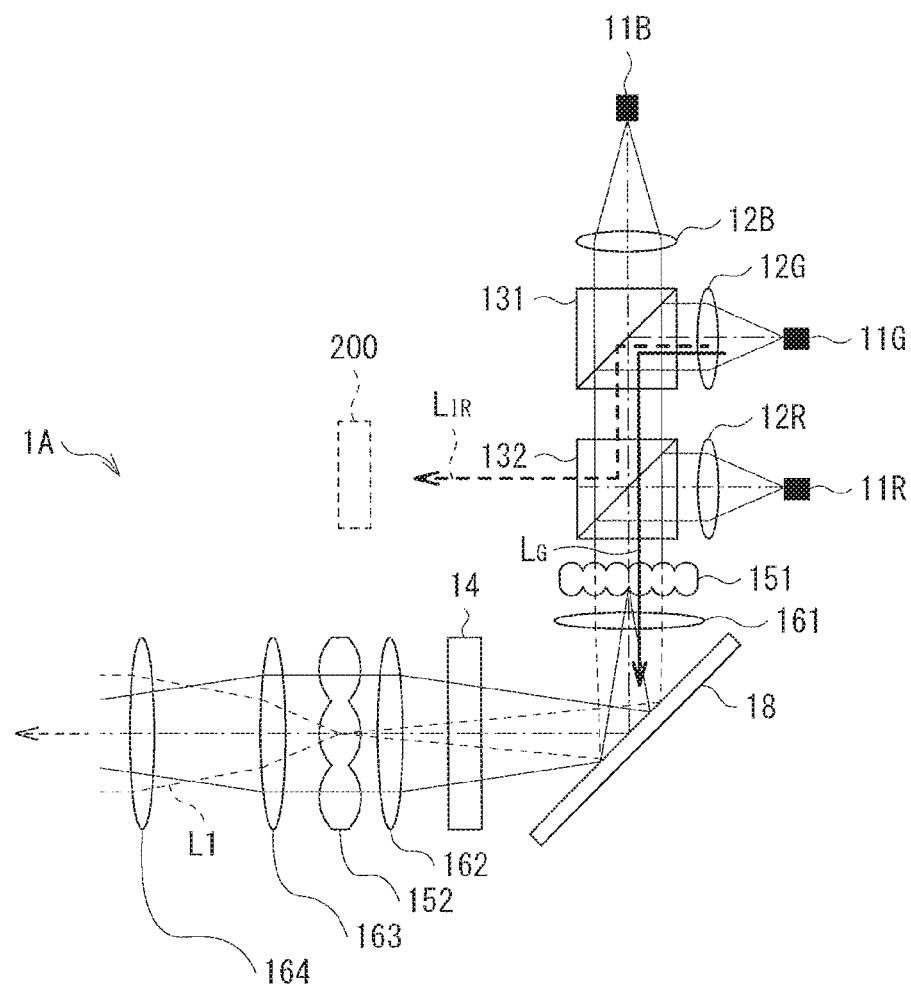

[FIG. 12]
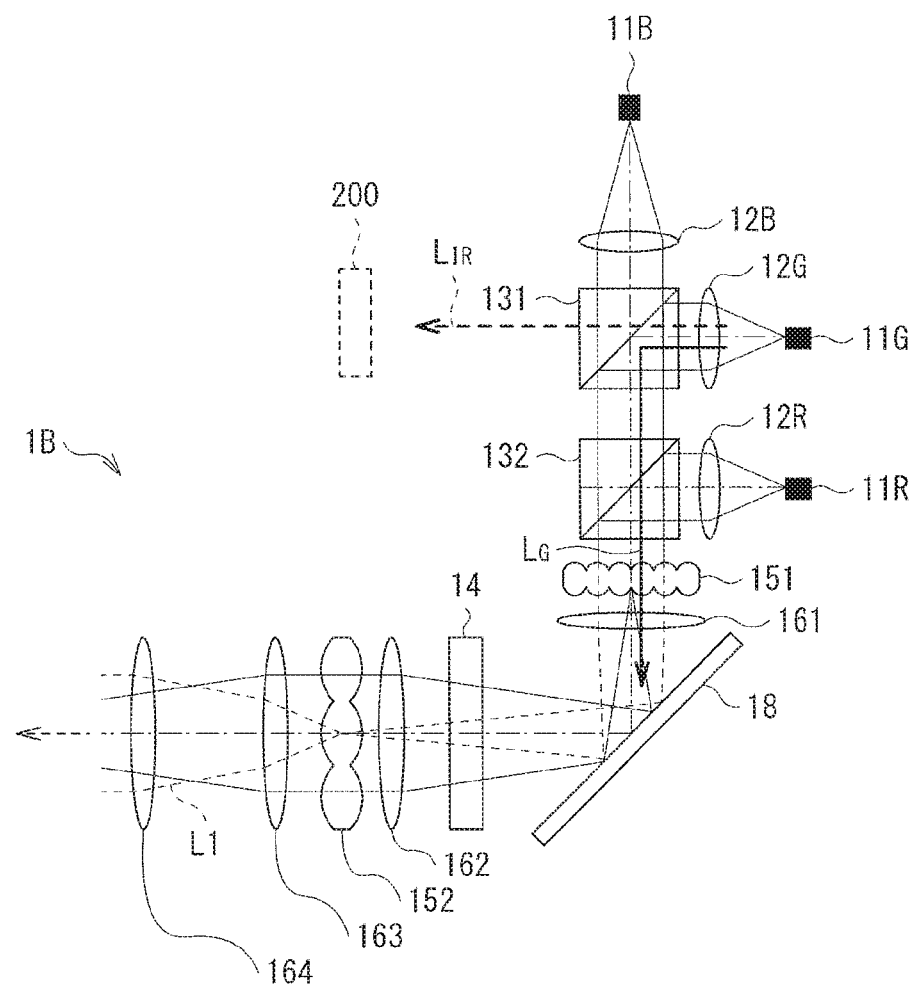

[FIG. 13]
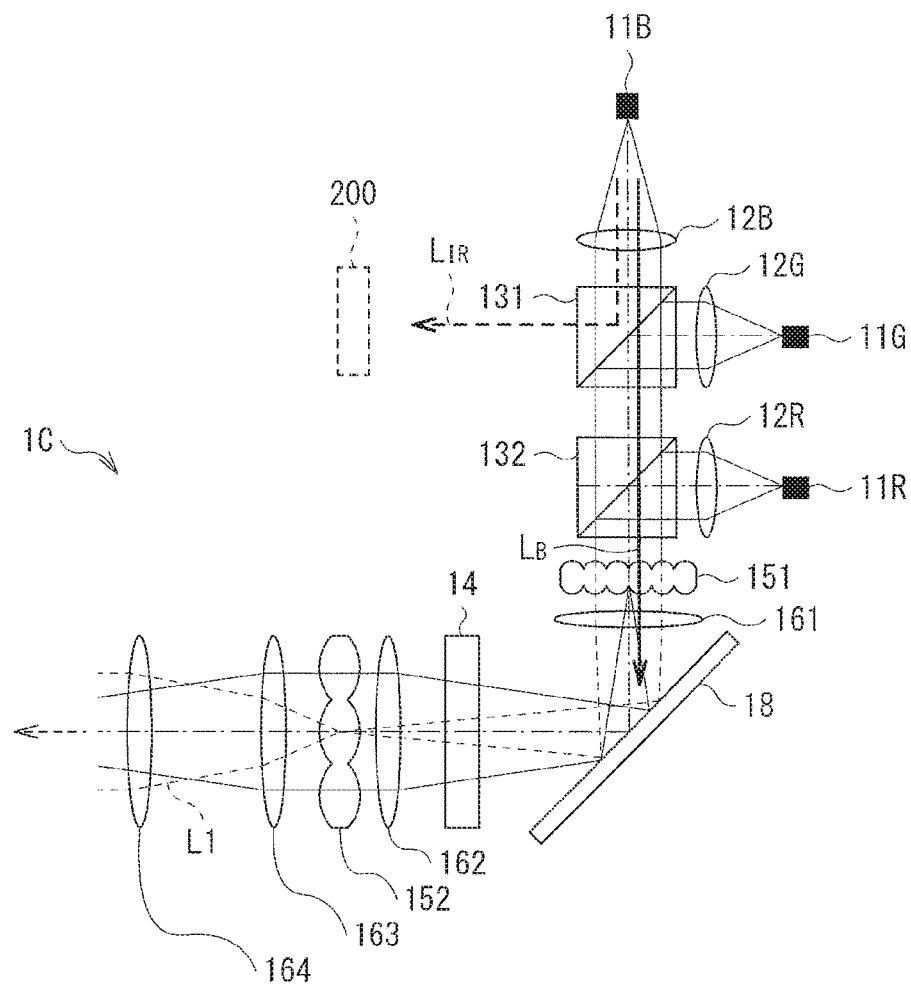

[ FIG. 14 ]
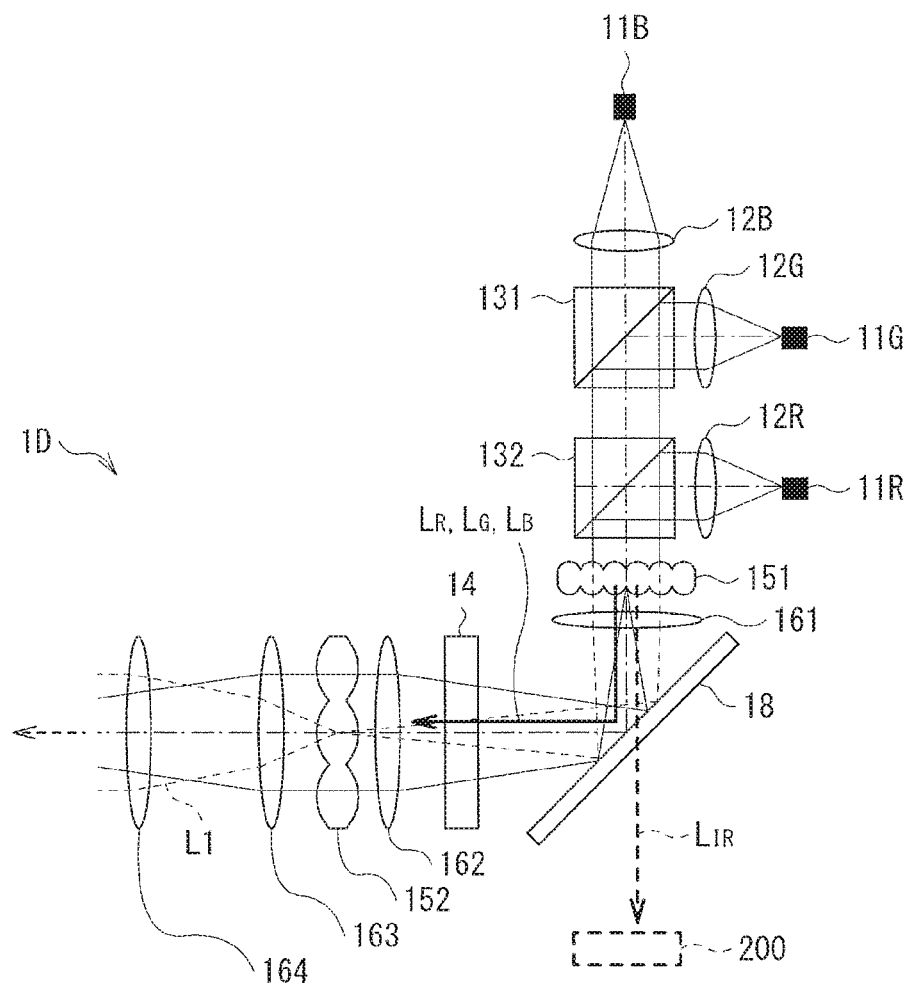

[ FIG. 15 ]
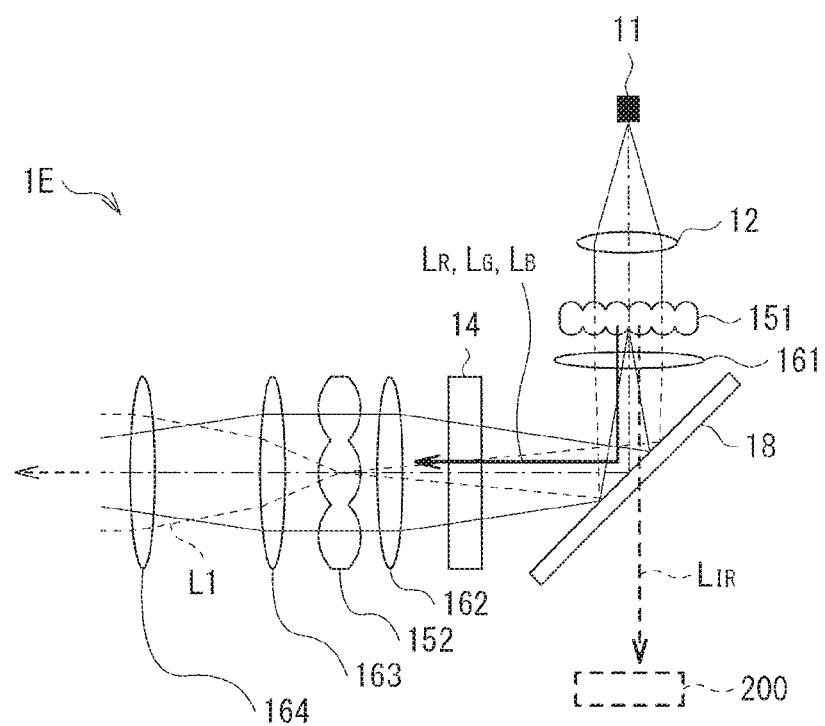

[ FIG. 16 ]
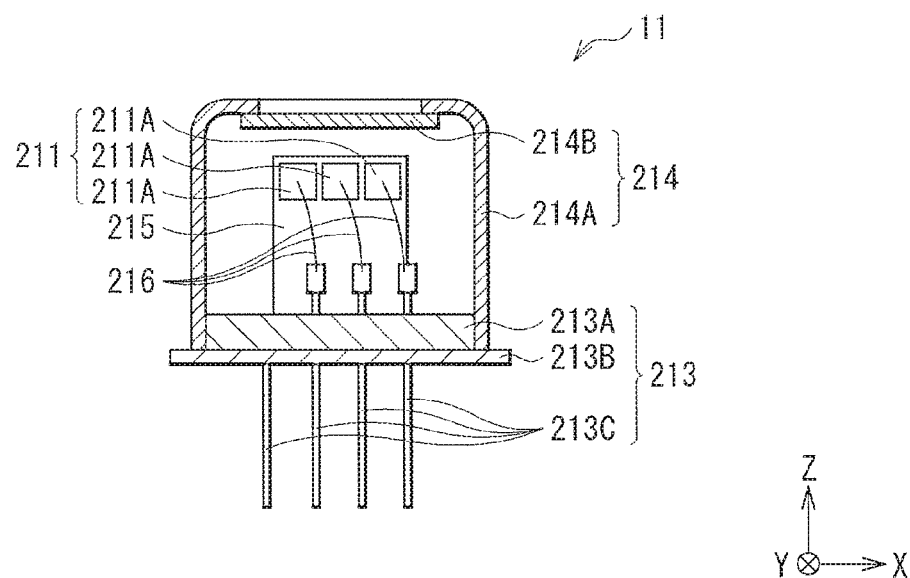
[ FIG. 17 ]
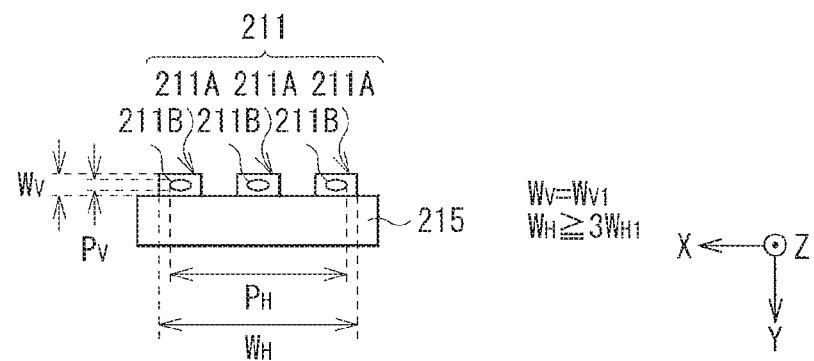

[ FIG. 18 ]
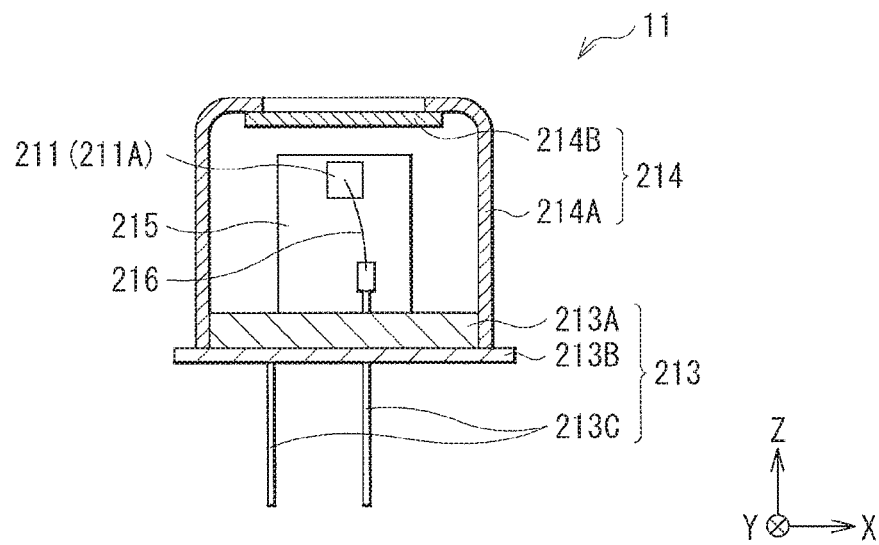
[ FIG. 19 ]
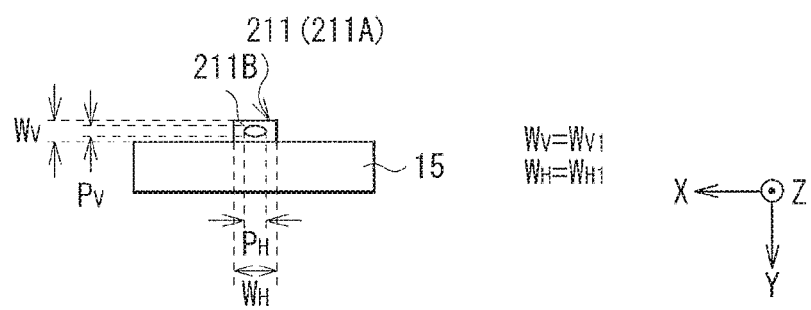
[ FIG. 20 ]
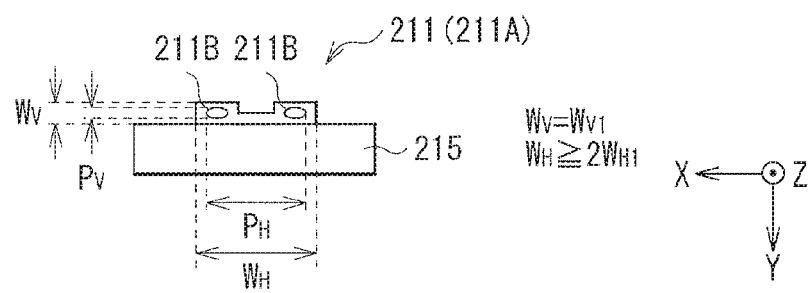

PROJECTION DISPLAY APPARATUS

CROSS REFERENCE TO RELATED APPLICATIONS

The present application is a continuation application of U.S. patent application Ser. No. 15/325,675, filed Jan. 11, 2017, which is a National Stage of PCT/JP2015/067611, filed Jun. 18, 2015, and claims the benefit of priority from prior Japanese Patent Application JP 2014-153406, filed Jul. 29, 2014, the entire content of which is hereby incorporated by reference.

TECHNICAL FIELD

The disclosure relates to a projection display apparatus having a function of detecting an object on a projection surface or in the vicinity thereof.

BACKGROUND ART

In recent years, in a smartphone, a tablet terminal, or any other similar mobile apparatus, the use of a touch panel has made it possible to perform page scrolling or zooming and shrinking of images being displayed on a screen through pointing operation in response to human intuition. Meanwhile, a display apparatus that displays images by projecting them on a screen has been known as a projector over the years.

CITATION LIST

Patent Literature

[PTL 1] Japanese Unexamined Patent Application Publication No. 2013-3859
[PTL 2] Japanese Unexamined Patent Application Publication No. 2007-52218
[PTL 3] Japanese Unexamined Patent Application Publication No. 2003-44839

SUMMARY OF THE INVENTION

In recent years, also in the projector, it has been desired to perform the pointing operation of projected images in such a manner that the touch panel is manipulated manually in response to the human intuition like the tablet terminal, or any other similar mobile apparatus. In particular, a small-sized projector of a handheld type has recently emerged in the market, and accordingly, it has been desired to perform the pointing operation of images being projected in a size ranging from about 20 inches to about 30 inches on a projection area. However, no touch panel is built into a screen or a wall on which images are projected, and therefore, it is necessary to detect manual operation using other means. Alternatively, apart from such a method, there are some projectors that enable images to be manipulated by operating, for example, a remote controller. However, the small-sized projector itself is small in size, and it would not be stylish to operate the small-sized projector using, for example, the remote controller.

PTL 1 proposes an apparatus that enables the pointing operation of images with coverage of the projection area by combining a projector with a detector that detects manual operation (gesture). However, in the apparatus proposed in PTL 1, a projector unit and a detector unit are separately configured as independent units. This easily results in an increase in size of a whole system. Further, in addition to the increase in size, calibration operation involving accuracy is also necessary in terms of, for example, a configuration of relative positional coordinates of an area being projected and an area to be detected. The calibration accuracy is important because it has a direct influence on the accuracy of the pointing operation. The calibration is cumbersome because it is necessary to deal with every corner of a screen.

PTL 2 and PTL 3 propose apparatuses that add an imaging function to a projector. However, in the apparatus proposed in PTL 3, light flux from a light source such as an ultrahigh-pressure mercury lamp is made to enter a polarization converter element that adjusts such light flux to a specific polarization component. The resultant polarization component is guided to a light valve. In this kind of polarization converter element, however, a component that has not been converted into the specific polarization component may enter an imaging device instead of the light valve. Accordingly, imaging may be affected by illuminating light for projection. Alternatively, if a dedicated polarization converter element for imaging use is added to avoid such a disadvantage, a projection lens becomes larger in size. Therefore, such a method is not suitable for practical use. On the contrary, in the apparatus proposed in PTL 2, the illuminating light is turned off in the imaging. This prevents the imaging from being affected by the illuminating light, without adding the dedicated polarization converter element for imaging. However, because the illuminating light is turned off in the imaging, when the apparatus is used under, for example, dark external environment, it is difficult to assure sufficient brightness necessary for the imaging. Therefore, the apparatus has restrictions in use as an apparatus that is often used under dark environment like a projector.

It is therefore desirable to provide a projection display apparatus that makes it possible to improve accuracy of object detection.

A projection display apparatus according to an embodiment of the disclosure includes: a light valve that modulates illuminating light on a basis of image data to output the modulated light; an illuminating unit including a light source, and a plurality of optical members for illumination that generate the illuminating light on a basis of light from the light source to guide the illuminating light to the light valve; a projection lens that projects the modulated light from the light valve on a projection surface, and allows detection light to enter from a direction opposite to a travelling direction of the modulated light; and an imaging device that is disposed at a location optically conjugated with the light valve, and allows the detection light to enter through the projection lens. One or more of the plurality of optical members for illumination have optical property of reducing a noise component. The noise component affects the detection light and arises inside the illuminating unit.

In the projection display apparatus according to the embodiment of the disclosure, the noise component is reduced by the one or more of the plurality of optical members for illumination. The noise component affects the detection light and arises inside the illuminating unit.

According to the projection display apparatus of the embodiment of the disclosure, the noise component is reduced by the one or more of the plurality of optical members for illumination. The noise component affects the detection light and arises inside the illuminating unit. Hence, it is possible to improve the accuracy of the object detection.

It is to be noted that some effects described here are not necessarily limitative, and any of other effects described herein may be achieved.

BRIEF DESCRIPTION OF DRAWINGS

FIG. 1 is a configuration diagram illustrating an example of an overall configuration of a projection display apparatus according to an example embodiment of the disclosure.

FIG. 2 is an external view illustrating an example of a state where image display and object detection are performed in the projection display apparatus.

FIG. 3 is a configuration diagram illustrating an example of a state where the projection display apparatus illustrated in FIG. 2 is viewed from a lateral side direction.

FIG. 4 is a cross-sectional view of a main part that illustrates an example of light entering a light valve and an imaging device.

FIG. 5 is an explanatory diagram schematically illustrating a concept of the image display and the object detection.

FIG. 6 is a configuration diagram illustrating an example where a noise component arising inside an illuminating unit is reduced by a second dichroic prism.

FIG. 7 is a characteristic diagram illustrating an example of optical property of the second dichroic prism.

FIG. 8 is a characteristic diagram illustrating an example of wavelength characteristics of a detection signal and the noise component.

FIG. 9 is a characteristic diagram illustrating an example where the noise component is reduced.

FIG. 10 is a cross-sectional view of a main part that illustrates a modification example where a polarizing beam splitter is used as a polarization split element.

FIG. 11 is a configuration diagram of a main part that illustrates a second example where the noise component is reduced.

FIG. 12 is a configuration diagram of a main part that illustrates a third example where the noise component is reduced.

FIG. 13 is a configuration diagram of a main part that illustrates a fourth example where the noise component is reduced.

FIG. 14 is a configuration diagram of a main part that illustrates a fifth example where the noise component is reduced.

FIG. 15 is a configuration diagram illustrating a configuration example of an illuminating unit provided with a single light source.

FIG. 16 is a cross-sectional view illustrating a configuration example of the light source.

FIG. 17 is a configuration diagram illustrating the light source illustrated in FIG. 16 as viewed from light-output-surface side.

FIG. 18 is a cross-sectional view illustrating another configuration example of the light source.

FIG. 19 is a configuration diagram illustrating the light source illustrated in FIG. 18 as viewed from the light-output-surface side.

FIG. 20 is a configuration diagram illustrating another configuration example of the light source illustrated in FIG. 18.

MODES FOR CARRYING OUT THE INVENTION

In the following, some embodiments of the disclosure are described in detail with reference to the drawings. It is to be noted that description is given in the following order.

1. Example Embodiment of Projection Display Apparatus Having Detection Function (FIGS. 1 to 9)
    1.1 Configuration
    1.2 Operation and Workings
        1.2.1 Basic Operation
        1.2.2 Workings of Polarizer
        1.2.3 Regarding Reduction in Noise Component Arising inside Illuminating Unit
    1.3 Effects
2. Modification Examples
    2.1 First Modification Example (FIG. 10)
    2.2 Second Modification Example (FIG. 11)
    2.3 Third Modification Example (FIG. 12)
    2.4 Fourth Modification Example (FIG. 13)
    2.5 Fifth Modification Example (FIG. 14)
    2.6 Sixth Modification Example (FIG. 15, and FIGS. 16 to 20)
    2.7 Seventh Modification Example
    2.8 Other Modification Examples
3. Other Example Embodiments

1. EXAMPLE EMBODIMENT OF PROJECTION DISPLAY APPARATUS HAVING DETECTION FUNCTION

1.1 Configuration

FIG. 1 illustrates an example of an overall configuration of a projection display apparatus (projector) according to an example embodiment of the disclosure. The projection display apparatus may have a function of performing object detection actively using near-infrared light, along with video image display. FIG. 2 illustrates an example of a state where video image display and object detection are performed in the projection display apparatus. FIG. 3 illustrates an example of a state where the projection display apparatus illustrated in FIG. 2 is viewed from a lateral side direction. FIG. 4 illustrates an example of light entering a light valve 21 and an imaging device 22 in the projection display apparatus illustrated in FIG. 1. FIG. 5 schematically illustrates a concept of the video image display and the object detection performed by the projection display apparatus.

Referring to FIG. 1, the projection display apparatus may include an illuminating unit 1, a light valve 21, an imaging device 22, a wire grid 27 that may serve as a polarization split element, a projection lens 24, a polarizer 25S that may serve as a polarizing member, an image processor 26, and an illumination controller 29.

The illuminating unit 1 may output illuminating light L1 from a first direction Z1 toward the wire grid 27, as illustrated in FIG. 4. The illuminating unit 1 includes a light source, and a plurality of optical members for illumination that generate the illuminating light L1 on the basis of light from the light source to guide the illuminating light L1 to the light valve 21. The light source may include a plurality of light sources that are disposed on different optical paths. The illuminating unit 1 may also include an optical path combination element that combines two or more of the optical paths on which respective two or more light sources of the plurality of light sources are disposed.

In a more specific example, the illuminating unit 1 may include a blue laser 11B, a green laser 11G, and a red laser 11R, as the plurality of light sources that are disposed on the different optical paths. The illuminating unit 1 may also include, as the plurality of optical members for illumination, a first coupling lens 12B, a second coupling lens 12G, a third coupling lens 12R, a driving optical element 14, a mirror 18, a first dichroic prism 131, a second dichroic prism 132, a first fly-eye lens 151, a second fly-eye lens 152, a first condenser lens 161, a second condenser lens 162, a third condenser lens 163, and a fourth condenser lens 164.

The blue laser 11B is a laser light source that may emit blue light with a wavelength of about 450 nm, for example. The green laser 11G is a laser light source that may emit green light with a wavelength of about 520 nm, for example. The red laser 11R is a laser light source that may emit red light with a wavelength of about 640 nm, for example.

The illumination controller 29 may perform a light emission control of a first light source (for example, the blue laser 11B), a second light source (for example, the green laser 11G), and a third light source (for example, the red laser 11R). For example, the illumination controller 29 may perform the light emission control of each of the first to third light sources in a field sequential method.

The second coupling lens 12G may be a lens (coupling lens) that collimates the green light outputted from the green laser 11G (into parallel light) to couple the resultant light to the first dichroic prism 131. Similarly, the first coupling lens 12B may be a lens (coupling lens) that collimates the blue light outputted from the blue laser 11B to couple the resultant light to the first dichroic prism 131. Further, the third coupling lens 12R may be a lens (coupling lens) that collimates the red light outputted from the red laser 11R to couple the resultant light to the second dichroic prism 132. It is to be noted that in one preferable example, these coupling lenses 12R, 12G, and 12B may collimate their respective entering laser light (into the parallel light).

Each of the first dichroic prism 131 and the second dichroic prism 132 may serve as the optical path combination element that combines the two or more of the optical paths on which the respective two or more light sources are disposed. The first dichroic prism 131 may be a prism that selectively transmits the blue light entering through the first coupling lens 12B, while selectively reflecting the green light entering through the second coupling lens 12G. The second dichroic prism 132 may be a prism that selectively transmits the blue light and the green light outputted from the first dichroic prism 131, while selectively reflecting the red light entering through the third coupling lens 12R. Thus, color synthesis (optical path combination) relative to the red light, the green light, and the blue light may be carried out.

The driving optical element 14 may be an optical element that reduces speckle noise and an interference pattern in the illuminating light L1, and be disposed on an optical path between the first condenser lens 161 and the second condenser lens 162. The driving optical element 14 may vibrate minimally in a direction along an optical axis or in a vertical direction relative to the optical axis, for example, to vary a state of passing-through light flux, thereby allowing for reduction in the speckle noise and the interference pattern in the illuminating light L1.

Each of the first fly-eye lens 151 and the second fly-eye lens 152 may be an optical member (integrator) in which a plurality of lenses are arranged two-dimensionally on a substrate, and spatially divide entering light flux, depending on arrangement of the plurality of lenses, to output the resultant light flux. The first fly-eye lens 151 may be disposed on an optical path between the second dichroic prism 132 and the first condenser lens 161. The second fly-eye lens 152 may be disposed on an optical path between the second condenser lens 162 and the third condenser lens 163. Uniformization of distribution of an in-plane light quantity may be attained by the first fly-eye lens 151 and the second fly-eye lens 152.

The mirror 18 may be an element that bends an optical path of the illuminating light L1. The mirror 18 may be disposed on an optical path between the first condenser lens 161 and the driving optical element 14. The first condenser lens 161 may be a lens that collects the light outputted from the first fly-eye lens 151 to make the resultant light enter the driving optical element 14 through the mirror 18. The second condenser lens 162 may be a lens that collects the light outputted from the driving optical element 14 to make the resultant light enter the second fly-eye lens 152.

Each of the third condenser lens 163 and the fourth condenser lens 164 may be a lens that collects the light outputted from the second fly-eye lens 152 to output the resultant light, as the illuminating light L1, toward the wire grid 27.

The wire grid 27 may be a metallic grid with minute meshes formed on a glass substrate, for example. As illustrated in FIG. 4, the wire grid 27 may allow the illuminating light L1 to enter from the first direction Z1. The light valve 21 may be disposed in a second direction Z2. The polarizer 25S and the imaging device 22 may be disposed in a third direction Z3. The projection lens 24 may be disposed in a fourth direction Z4.

The wire grid 27 may serve as the polarization split element that splits entering light into a first polarization component (for example, a P polarization component) and a second polarization component (for example, an S polarization component) to output the components in different directions from each other. The wire grid 27 may selectively reflect the specific first polarization component, and selectively transmit the specific second polarization component. For example, as illustrated in FIG. 4, the wire grid 27 may output (reflect) most of a P polarization component Lp1 toward the second direction Z2, and output (transmit) most of an S polarization component Ls1 toward the third direction Z3. The P polarization component Lp1 may be included in the illuminating light L1 entering from the first direction Z1. Further, as illustrated in FIG. 4, the wire grid 27 may output (reflect) most of a P polarization component Lp3 toward the third direction Z3. The P polarization component Lp3 may be included in detection light L2 entering from a direction opposite to the fourth direction Z4.

The light valve 21 may be a reflective liquid crystal device such as an LCOS (Liquid Crystal On Silicon) device. For example, as illustrated in FIG. 4, the light valve 21 modulates, on the basis of image data, the first polarization component (for example, the P polarization component Lp1) entering from the second direction Z2 through the wire grid 27. The first polarization component may be included in the illuminating light L1. Further, the light valve 21 outputs the modulated light toward the fourth direction Z4 through the wire grid 27. As illustrated in FIG. 4, the light valve 21 may output, for example, the S polarization component Ls2, as the modulated light, a polarization state of which is rotated from a polarization state at time of entering. It is to be noted that in the light valve 21, it is possible to perform black display by returning the entering P polarization component Lp1 back to the wire grid 27 in a polarization state as it is.

The projection lens 24 projects the modulated light from the light valve 21 on a projection surface 30A of a screen 30. The modulated light may enter the projection lens 24 from the fourth direction Z4 through the wire grid 27. Further, as illustrated in FIG. 4, the projection lens 24 allows the detection light L2 to enter from a direction opposite to a travelling direction of the modulated light. The projection lens 24 may be a projection optical system for image projection, and also function as an imaging optical system for object detection.

The imaging device 22 may include a solid-state imaging device such as a CMOS (Complementary Metal-Oxide Semiconductor) device and a CCD (Charge-Coupled Device). The imaging device 22 is disposed at a location that is optically conjugated with the light valve 21. In one more specific example, when the light valve 21 is the reflective liquid crystal device, arrangement may be made in such a manner that a display surface (liquid crystal surface) for creating images and an imaging surface of the imaging device 22 are located at optically conjugated positions. As illustrated in FIG. 4, the imaging device 22 allows the detection light L2 to enter from the third direction Z3 through the projection lens 24 and the wire grid 27.

The polarizer 25S may serve as the polarization member that is one of optical members that reduces the second polarization component included in the illuminating light L1. The polarizer 25S may be disposed between the imaging device 22 and the wire grid 27. The polarizer 25S may remove the second polarization component (for example, the S polarization component) included in entering light. As illustrated in FIG. 4, the polarizer 25S may remove at least the S polarization component Ls1 included in the illuminating light L1 entering through the wire grid 27, as the second polarization component.

The image processor 26 may detect, on the basis of a result of imaging by the imaging device 22, a position P1 of a feature point of a pointing object (physical object) 71 by making the position P1 correspond to coordinates of a projection image V2 projected on the projection surface 30A, as illustrated in FIGS. 2, 3, and 5. Examples of the pointing object 71 may include a human finger or a pointer. As an example of the feature point, a position of a human finger tip is illustrated in each of FIGS. 2, 3, and 5. However, the position is not limited thereto, and a center of gravity of the human finger, a center of gravity of a human hand, or any other position may be selectable as appropriate.

Each of FIGS. 2 and 3 illustrates a configuration assuming a case where the projection display apparatus is a short focus type. As illustrated in FIGS. 2 and 3, the projection display apparatus may include a near-infrared light projecting unit 40 under a main body 100. The projection surface 30A may be, for example, a flat floor surface. The near-infrared light projecting unit 40 may serve as a light source unit for detection that emits near-infrared light for detection 41 as invisible light for detection at a predetermined height h from the projection surface 30A. The near-infrared light projecting unit 40 may emit the near-infrared light for detection 41, to provide coverage of at least a projection area 31 on the projection surface 30A with the near-infrared light for detection 41 from the predetermined height h. The imaging device 22 may allow near-infrared scattered light La, as the detection light, to enter through the projection lens 24 and the wire grid 27. The near-infrared scattered light La may be diffused by the pointing object 71. It is to be noted that the near-infrared light projecting unit 40 may irradiate the projection surface 30A with the near-infrared light for detection 41 having a thickness in a direction of the height h, as the invisible light for detection. In this case, the near-infrared light for detection 41 and the projection surface 30A may not be completely spaced apart at the predetermined height h. For example, a state may be permitted where part of light (light at the height h of 0 (h=0)) in a direction of the thickness (the direction of the height h) of the near-infrared light for detection 41 touches (overlaps) the projection surface 30A.

In the projection display apparatus, the projection lens 24 may be an ultrashort focus lens with a throw ratio of about 0.38 or less. Here, the throw ratio is expressed as L/H, where L is a distance from the projection lens 24 to the projection surface 30A, and H is a width of the projection area, as illustrated in FIGS. 2 and 3.

1.2 Operation and Workings 1.2.1 Basic Operation

In the projection display apparatus, as illustrated in FIGS. 1 and 5, image information V1 formed on the light valve 21 may be projected on the projection surface 30A of the screen 30 by the projection lens 24 to perform enlarged display of such an image as a projection image V2. Further, in the projection display apparatus, a position of an object on the projection surface 30A, for example, the position P1 of the feature point of the pointing object (physical object) 71 may be detected with use of the imaging device 22. Examples of the pointing object 71 may include the human finger and the pointer. The imaging device 22 may carry out imaging of an imaging area 32. The imaging area 32 may be substantially a same area as the projection area 31 on the projection surface 30A.

In the projection display apparatus, laser light sources may be used in the illuminating unit 1. This makes it possible to adjust the polarization component of the illuminating light L1 to be dominant. In one specific example, the first polarization component may be adjusted to 99% or more, and more preferably, to 99.5% or more. Here, as the dominant first polarization component, either the S polarization component Ls1 or the P polarization component Lp1 may be selectable depending on characteristics of a polarization converter device.

On an assumption that the first polarization component is the P polarization component, and the second polarization component is the S polarization component, the wire grid 27 may reflect most of the P polarization component, and transmit most of the S polarization component. Therefore, for example, 99.5% of the illuminating light L1 may be assigned to the P polarization component Lp1 as the dominant polarization component, and remaining 0.5% may be assigned to the S polarization component Ls1. For example, as illustrated in FIG. 4, the wire grid 27 may reflect most of the dominant P polarization component Lp1 to output the reflection to the light valve 21. The P polarization component Lp1 entering the light valve 21 may be modulated (rotated) by the light valve 21 to become the modulated light of the S polarization components Ls2, and thereafter, enter the projection lens 24 through the wire grid 27. As illustrated in FIG. 5, the S polarization component Ls2 as the modulated light may be projected as the projection image V2 on the projection surface 30A of the screen 30 through the projection lens 24.

In the projection display apparatus, the imaging device 22 is disposed at a location that is optically conjugated with the light valve 21. Further, the projection lens 24 may be the projection optical system for image projection, and also function as the imaging optical system for object detection. This allows the imaging device 22 to perform the imaging of the imaging area 32 that is the same area as the projection area 31, as illustrated in FIG. 5. The light valve 21 and the imaging device 22 are located at conjugated positions, which makes it possible to monitor the position P1 of the feature point of the pointing object 71 such as the human finger or the pointer on the projection surface 30A by overlaying the position P1 on the projection image V2 through the projection lens 24. Further, for example, the image processor 26 may perform image processing of a shape of the pointing object 71 to detect coordinates of the position P1 of the feature point of the pointing object 71, thereby allowing for pointing operation of the projection image V2. At this time, any coordinate position in the projection area 31 may correspond to a coordinate position in the imaging area 32 on a one-to-one basis. Therefore, coordinates of a detected position P2 on the side of the imaging device 22 may correspond to the coordinates of the position P1 of the feature point of the pointing object 71. It is to be noted that the number of the pointing objects 71 may be two or more. For example, coordinates of finger tips of both hands may be detectable. The use of the position of the feature point of the pointing object 71 detected in such a manner makes it possible to perform the operation in an intuitive manner as if a touch panel were built into the projection image V2 of the projector.

In the projection display apparatus, as illustrated in FIGS. 2 and 3, a membrane-like near-infrared light barrier may be provided over the projection area 31 at a predetermined height h, to provide the coverage of the projection area 31 in an area direction and of two or three millimeters in a height direction. The height h may be within a range of, for example, several millimeters to dozens of millimeters from the projection surface 30A. As a result, because the projection surface 30A is generally flat, if there is no shielding object or no pointing object 71 such as the finger and a pointing rod, a membrane of emitted near-infrared light may travel straight ahead without being shielded on the way. Therefore, no image of such a membrane is formed on the imaging device 22 that is monitoring the projection surface 30A. In such a state, if the finger or any other object is moved closer to a position at a distance of several millimeters from the projection surface 30A provided with the near-infrared light barrier, or operation of, for example, touching the projection surface 30A is performed, light of the barrier is shielded by the finger to be diffused at that point. The light hitting the finger to be diffused travels toward every direction, and part of the light returns to an aperture of the projection lens 24. Such return light passes through the projection lens 24, and is reflected by the wire grid 27 to reach the imaging device 22. At this time, since the light valve 21 and the imaging device 22 that create images are disposed at conjugated positions, a bright spot diffusion point arising as a dot on the projection surface 30A forms an image on the imaging device 22, and forms the image at a position corresponding to the projected image in a one-to-one relationship. This allows for position detection. Further, in a case of the ultrashort focus type, projection light passes in the vicinity of the projection surface 30A, and a part of an operator's body is unlikely to shield the projection light. This leads to an advantage of enhanced visibility of a screen during operation.

1.2.2 Workings of Polarizer

Next, description is provided on workings of the polarizer 25S with reference to FIG. 4. The detection light L2 entering the wire grid 27 may include an S polarization component Ls3 and the P polarization component Lp3 as polarization components. The wire grid 27 may reflect most of the P polarization component Lp3 in the third direction Z3. Assuming that the polarizer 25S removes the S polarization component, almost all of the reflected P polarization component Lp3 may reach the imaging device 22. Further, out of the illuminating light L1 entering the wire grid 27, the S polarization component Ls1 may be outputted toward the third direction Z3. The S polarization component Ls1 becomes a noise component that may affect the detection light L2. If the S polarization component Ls1 enters the imaging device 22, an S/N ratio during detection may be reduced, leading to degradation of detection accuracy. Disposing the polarizer 25S to remove the S polarization component Ls1 makes it possible to increase the S/N ratio and to improve the detection accuracy.

As described above, it is, ideally, possible to make only the detection light L2 enter the imaging device 22 in such a manner that the P polarization component Lp1 of the illuminating light L1 may be reflected by the wire grid 27 in a direction different from the imaging device 22, and the S polarization component Ls1 may be removed by the polarizer 25S. However, there is possibility that an unwanted noise component included in the illuminating light L1 may enter the imaging device 22, depending on an entering angle of light that enters the wire grid 27 or optical performance of the wire grid 27 and the polarizer 25S. Accordingly, as illustrated in FIG. 6 to be described below, a configuration may be desirable in which the noise component that may affect the detection light may be reduced inside the illuminating unit 1.

1.2.3 Regarding Reduction of Noise Component Arising Inside Illuminating Unit In the projection display apparatus, the projection lens 24 may be communalized by disposing the light valve 21 for image display and the imaging device 22 for object detection at optically conjugated positions. Thus, the whole optical system is reduced in size. Further, the infrared light for detection may be sent from a different optical system from the light source for image display. This allows for high-accuracy object detection that reduces a load of image processing. However, in an event of generation of light serving as the noise component that may degrade the detection accuracy on the light source side for image display, there is likelihood that the noise component may enter the imaging device 22 to cause a failure in object detection or significant degradation in the detection accuracy. In this case, for example, it may be considered to dispose a dedicated part such as a filter that cuts the light serving as the noise component on an optical path between the imaging device 22 and the illuminating unit 1. But addition of the dedicated part such as the filter causes an additional count of parts or an increase in size of the optical system, and does not provide any fundamental solution to the characteristics in the illuminating unit 1.

Accordingly, in one preferable example, one or more of the plurality of optical members for illumination inside the illuminating unit 1 may have optical property of reducing the noise component that arises inside the illuminating unit 1. As an example, description is provided on an example case where in the illuminating unit 1, the red laser 11R emits weak infrared light $L_{IR}$ with a wavelength of, for example, about 800 nm as the noise component in addition to red light $L_R$ with a wavelength of, for example, about 640 nm. In this case, for example, the second dichroic prism 132 may have wavelength property of transmitting light of a blue (B) band, a green band (G), and an infrared (IR) band, and reflecting light of a red (R) band, as illustrated in FIG. 7. It is to be noted that in FIG. 7, a horizontal scale denotes a wavelength, and a vertical scale denotes reflectance. As a result, as illustrated in FIG. 6, the second dichroic prism 132 may transmit the blue and green light guided by the first dichroic prism 131, and reflect the red light $L_R$ guided by the third coupling lens 12R. At the same time, the second dichroic prism 132 may transmit the infrared light $L_{IR}$ guided by the third coupling lens 12R. The red light $L_R$ emitted by the red laser 11R may be reflected by the second dichroic prism 132, and guided as the illuminating light L1 toward the light valve 21, the projection lens 24, and the projection surface 30A to form an image. Meanwhile, the infrared light $L_{IR}$ may pass through the second dichroic prism 132, and be guided toward a direction deviated from the optical path of the illuminating light L1. This keeps the infrared light $L_{IR}$ from being guided to the imaging device 22, which allows for reduction in the noise component that may affect the detection light L2.

If the infrared light $L_{IR}$ serving as the noise component is not reduced, a large quantity of the noise component that may affect a detection signal may enter the imaging device 22, as illustrated in FIG. 8. On the contrary, when the noise component is reduced by the second dichroic prism 132, the noise component that may affect the detection signal is reduced as illustrated in FIG. 9. This allows for characteristics equivalent to those obtained by inserting an infrared light cutoff filter in an illuminating optical system, thereby improving the detection accuracy. It is to be noted that in each of FIGS. 8 and 9, a horizontal scale denotes a wavelength, and a vertical scale denotes a quantity of entering light.

It is to be noted that an absorber 200 may be provided, as illustrated in FIG. 6, on an optical path of the infrared light $L_{IR}$ that has passed through the second dichroic prism 132. The absorber 200 may absorb the infrared light $L_{IR}$. In another alternative example, an inner wall of a housing that accommodates the illuminating unit 1 may be processed so as to absorb the infrared light $L_{IR}$. This makes it possible to prevent the infrared light $L_{IR}$ from, for example, being reflected by the inner wall of the housing and returning to the optical path of the illuminating light L1.

1.3 Effects

As described, in this embodiment, the second dichroic prism 132 may serve as one of the optical members for illumination, and reduce the noise component that affects the detection light and arises inside the illuminating unit 1. Hence, it is possible to reduce the noise component that is unwanted during the object detection, thereby allowing for improved accuracy of the object detection. Further, it is possible to provide a small-sized and inexpensive configuration by communalizing the effect of reducing the noise component with the combination of the optical paths inside the illuminating unit 1. This make it possible to provide a small-sized, high-definition, and interactive laser projector that is installable on a small and lightweight electronic apparatus.

It is to be noted that effects described herein are merely exemplified and not limitative, and effects of the disclosure may be other effects or may further include other effects. The same is true for any other example embodiments and modification examples to be described below.

2. MODIFICATION EXAMPLES 2.1 First Modification Example

Each of FIGS. 1 and 4 illustrates a configuration example with use of the wire grid 27 as the polarization split element.

In an alternative configuration, however, a polarizing beam splitter 23 may be used instead of the wire grid 27, as in a first modification example illustrated in FIG. 10. Further, in the first modification example, a polarizer 25 that removes the P polarization component may be provided instead of the polarizer 25S that removes the S polarization component.

The polarizing beam splitter 23 may adopt a configuration of lamination of prisms each of which is coated with a multi-layer film, or may be a beam splitter similar to prisms that sandwich an element having polarizing property.

The wire grid 27 in the configuration illustrated in FIG. 4 may reflect the P polarization component that serves as the first polarization component, and transmit the S polarization component that serves as the second polarization component. However, the polarizing beam splitter 23 may have characteristics reverse to such characteristics.

The polarizing beam splitter 23 may have four optical surfaces. Here, description is given, with two surfaces facing in a horizontal direction in FIG. 10 being defined as a first optical surface and a third optical surface, and two surfaces facing in a vertical direction being defined as a second optical surface and a fourth optical surface. As illustrated in FIG. 10, the illuminating light L1 may enter the first optical surface of the polarizing beam splitter 23 from the first direction Z1. The light valve 21 may be disposed in the second direction Z2 relative to the second optical surface of the polarizing beam splitter 23. The polarizer 25 and the imaging device 22 may be disposed in the third direction Z3 relative to the third optical surface of the polarizing beam splitter 23. The projection lens 24 may be disposed in the fourth direction Z4 relative to the fourth optical surface of the polarizing beam splitter 23.

The polarizing beam splitter 23 may be the polarization split element that splits entering light into the first polarization component (for example, the S polarization component) and the second polarization component (for example, the P polarization component) to output such components in different directions from each other. The polarizing beam splitter 23 may selectively reflect the specific first polarization component, and selectively transmit the specific second polarization component. For example, as illustrated in FIG. 10, the polarizing beam splitter 23 may output (reflect), toward the second direction Z2, almost all of the S polarization component Ls1 included in the illuminating light L1 entering from the first direction Z1, and output (transmit), toward the third direction Z3, almost all of the P polarization component Lp1. Further, as illustrated in FIG. 10, the polarizing beam splitter 23 may output (reflect), toward the third direction Z3, almost all of the S polarization component Ls3 included in the detection light L2 entering from a direction opposite to the fourth direction Z4.

On an assumption that the first polarization component is the S polarization component, and the second polarization component is the P polarization component, the polarizing beam splitter 23 may reflect most of the S polarization component, and transmit most of the P polarization component. Therefore, for example, 99.5% of the illuminating light L1 may be assigned to the S polarization component Ls1 as the dominant polarization component, and remaining 0.5% may be assigned to the P polarization component Lp1. As illustrated in FIG. 10, the polarizing beam splitter 23 may reflect almost all of the dominant S polarization component Ls1 to output the reflection to the light valve 21. The S polarization component Ls1 entering the light valve 21 may be modulated (rotated) by the light valve 21 to become the modulated light of the P polarization component Lp2, and thereafter, enter the projection lens 24 through the polarizing beam splitter 23. As illustrated in FIG. 5, the P polarization component Lp2 as the modulated light may be projected as the projection image V2 on the projection surface 30A of the screen 30 through the projection lens 24.

Meanwhile, the detection light L2 entering the polarizing beam splitter 23 may include the S polarization component Ls3 and the P polarization component Lp3 as the polarization components. The polarizing beam splitter 23 may reflect almost all of the S polarization component Ls3 in the third direction Z3. Assuming that the polarizer 25 removes the P polarization component, almost all of the S polarization component Ls3 may reach the imaging device 22. Further, out of the illuminating light L1 entering the polarizing beam splitter 23, the P polarization component Lp1 may be outputted toward the third direction Z3. The P polarization component Lp1 may become the noise component that may affect the detection light L2. If the P polarization component Lp1 enters the imaging device 22, the S/N ratio during detection may be reduced, leading to the degradation of the detection accuracy. Disposing the polarizer 25 to remove the P polarization component Lp1 makes it possible to increase the S/N ratio and improve the detection accuracy.

As described above, it is, ideally, possible to make only the detection light L2 enter the imaging device 22 in such a manner that the S polarization component Ls1 of the illuminating light L1 may be reflected by the polarizing beam splitter 23 in a direction different from the imaging device 22, and the P polarization component Lp1 may be removed by the polarizer 25. However, there is possibility that the unwanted noise component included in the illuminating light L1 may enter the imaging device 22, depending on an entering angle of light that enters the polarizing beam splitter 23 or optical performance of the polarizing beam splitter 23 and the polarizer 25. Accordingly, as illustrated in FIG. 6, the configuration may be desirable in which the noise component that may affect the detection light may be reduced inside the illuminating unit 1.

2.2 Second Modification Example

FIG. 11 illustrates a second example where the noise component is reduced, as an illuminating unit 1A according to a second modification example. FIG. 11 illustrates an example case where the green laser 11G emits the weak infrared light $L_{IR}$ with the wavelength of, for example, about 800 nm in addition to green light $L_G$ with a wavelength of, for example, about 520 nm. In this case, for example, the second dichroic prism 132 may have wavelength property of transmitting blue light $L_B$ and the green light $L_G$, reflecting the red light $L_R$, and reflecting the infrared light $L_{IR}$, as illustrated in FIG. 11. As a result, the infrared light $L_{IR}$ may be guided toward the direction deviated from the optical path of the illuminating light L1. This keeps the infrared light $L_{IR}$ from being guided to the imaging device 22, which allows for the reduction in the noise component that may affect the detection light L2.

It is to be noted that the absorber 200 may be provided, as illustrated in FIG. 11, on the optical path of the infrared light $L_{IR}$ that is guided toward the direction deviated from the optical path of the illuminating light L1. The absorber 200 may absorb the infrared light $L_{IR}$. In another alternative example, the inner wall of the housing that accommodates the illuminating unit 1 may be processed so as to absorb the infrared light $L_{IR}$. This makes it possible to prevent the infrared light $L_{IR}$ from, for example, being reflected by the inner wall of the housing and returning to the optical path of the illuminating light L1. This may also apply to other modification examples to be described below.

2.3 Third Modification Example

FIG. 12 illustrates a third example where the noise component is reduced, as an illuminating unit 1B according to a third modification example. As with the example in FIG. 11, FIG. 12 illustrates an example case where the green laser 11G emits the weak infrared light $L_{IR}$ with the wavelength of, for example, about 800 nm in addition to the green light $L_G$ with the wavelength of, for example, about 520 nm. In this case, for example, the first dichroic prism 131 may have wavelength property of transmitting the blue light $L_B$, reflecting the green light $L_G$, and transmitting the infrared light $L_{IR}$, as illustrated in FIG. 12. As a result, the infrared light $L_{IR}$ may be guided toward the direction deviated from the optical path of the illuminating light L1. This keeps the infrared light $L_{IR}$ from being guided to the imaging device 22, which allows for the reduction in the noise component that may affect the detection light L2.

2.4 Fourth Modification Example

FIG. 13 illustrates a fourth example where the noise component is reduced, as an illuminating unit 1C according to a fourth modification example. FIG. 13 illustrates an example case where the blue laser 11B emits the weak infrared light $L_{IR}$ with the wavelength of, for example, about 800 nm in addition to the blue light $L_B$ with the wavelength of, for example, about 450 nm. In this case, for example, the first dichroic prism 131 may have wavelength property of transmitting the blue light $L_B$, reflecting the green light $L_G$, and reflecting the infrared light $L_{IR}$, as illustrated in FIG. 13. As a result, the infrared light $L_{IR}$ may be guided toward the direction deviated from the optical path of the illuminating light L1. This keeps the infrared light $L_{IR}$ from being guided to the imaging device 22, which allows for the reduction in the noise component that may affect the detection light L2.

As an alternative configuration, although not illustrated, for example, the second dichroic prism 132 may have property of transmitting the blue light $L_B$, transmitting the green light $L_G$, reflecting the red light $L_R$, and reflecting the infrared light $L_{IR}$.

2.5 Fifth Modification Example

FIG. 14 illustrates a fifth example where the noise component is reduced, as an illuminating unit 1D according to a fifth modification example. As illustrated in FIG. 14, the mirror 18 that bends the optical path may have property of reflecting the blue light $L_B$, the green light $L_G$, and the red light $L_R$, and transmitting the infrared light $L_{IR}$. As a result, even if any of the light sources of the blue laser 11B, the green laser 11G, and the red laser 11R emits the infrared light $L_{IR}$, it is possible to reduce the noise component that may affect the detection light L2.

Allowing the mirror 18 to have the property of reducing the infrared light $L_{IR}$ also makes it possible to deal with a case where an optical member other than the light sources emits the infrared light $L_{IR}$. For example, even if the infrared light $L_{IR}$ is generated because a multi-layer film of the second dichroic prism 132 excites the red light, the infrared light $L_{IR}$ may be guided by the mirror 18 toward the direction deviated from the optical path of the illuminating light L1. This allows for the reduction in the noise component that may affect the detection light L2.

2.6 Sixth Modification Example

FIG. 15 illustrates a configuration example of an illuminating unit 1E according to a sixth modification example. As illustrated in FIG. 15, in one alternative configuration, the illuminating unit 1E may include a single light source 11 and a coupling lens 12 instead of the blue laser 11B, the green laser 11G, and the red laser 11R. In this case, the first dichroic prism 131 and the second dichroic prism 132 may be omitted.

For example, as illustrated in FIGS. 16 and 17, the light source 11 may have a configuration including a plurality of chips 211A each of which emits different color light. For example, the light source 11 may include the three chips 211A that emit the red light $L_R$, the green light $L_G$, and the blue light $L_B$. In this case, as illustrated in FIG. 15, the mirror 18 may have property of reflecting the blue light $L_B$, the green light $L_G$, and the red light $L_R$, and transmitting the infrared light $L_{IR}$. As a result, even if the weak infrared light $L_{IR}$ is emitted from the light source 11, it is possible to reduce the infrared light $L_{IR}$ serving as the noise component that may affect the detection light L2.

Further, the projection display apparatus may perform monochrome image display, for example. In this case, for example, as illustrated in FIGS. 18 to 20, the light source 11 may have a configuration including the single chip 211A that emits single color light. Also in this case, the weak infrared light $L_{IR}$ emitted from the light source 11 may be guided by the mirror 18 toward the direction deviated from the optical path of the illuminating light L1, as illustrated in FIG. 15. It is to be noted that in one alternative configuration, all of the plurality of chips 211A may emit the same color light, in the configurations illustrated in FIGS. 16 and 17.

Each of the configuration examples illustrated in FIGS. 16 and 17, or FIGS. 18 to 20 represents a form of can type in which a solid-state light-emitting device 211 is housed in an internal space surrounded by a stem 213 and a cap 214. The solid-state light-emitting device 211 may include the single or the plurality of edge-emitting type chips 211A. It is to be noted that FIG. 17 illustrates a configuration of the light source 11 illustrated in FIG. 16 as viewed from light-output-surface side. FIG. 19 illustrates a configuration of the light source 11 illustrated in FIG. 18 as viewed from the light-output-surface side. FIG. 20 illustrates another configuration example of the light source 11 illustrated in FIG. 18.

The chip 211A may include, for example, a light-emitting diode (LED), an organic EL light-emitting device (OLED), or a laser diode (LD).

The stem 213 may constitute a package of the light source 11 together with the cap 214, and may include, for example, a support substrate 213A, an outer frame substrate 213B, and a plurality of connection terminals 213C. The support substrate 213A may support a sub-mount 215. The outer frame substrate 213B may be disposed on a back side of the support substrate 213A.

The sub-mount 215 may be made of a material having conductivity and heat dissipation performance. Each of the support substrate 213A and the outer frame substrate 213B may have a configuration in which one or a plurality of insulating through-holes and one or a plurality of conductive through-holes are formed on a base member having the conductivity and the heat dissipation performance. The support substrate 213A and the outer frame substrate 213B may take disk shapes, and be stacked with their central axes (not illustrated) aligned with each other. A diameter of the outer frame substrate 213B may be larger than a diameter of the support substrate 213A. An outer edge of the outer frame substrate 213B may be an annular flange that juts radially from the central axis of the outer frame substrate 213B in a plane where the central axis of the outer frame substrate 213B serves as a normal line. The flange may have a function of specifying a reference position in fitting the cap 214 into the support substrate 213A in a manufacturing process.

The plurality of connection terminals 213C may run through at least the support substrate 213A. Terminals (hereinafter referred to as "terminals α" for descriptive purpose) excluding one or more terminals among the plurality of connection terminals 213C may be electrically coupled, on a one-to-one basis, to electrodes (not illustrated) of the individual chips 211A. For example, the terminals α may protrude long on side on which the outer frame substrate 213B is disposed, and protrude short on side on which the support substrate 213A is disposed. Further, terminals (hereinafter referred to as "terminals β" for descriptive purpose) excluding the above-described terminals α among the plurality of connection terminals 213C may be electrically coupled to remaining electrodes (not illustrated) of all the chips 211A. For example, the terminals β may protrude long on the side on which the outer frame substrate 213B is disposed. End edges of the terminals β on the side on which the support substrate 213A is disposed may be embedded in the support substrate 213A. Out of each of the connection terminals 213C, the part protruding long on the side on which the outer frame substrate 213B is disposed may serve as a part to be fitted into, for example, a substrate. Moreover, out of each of the plurality of connection terminals 213C, the part protruding short on the side on which the support substrate 213A is disposed may serve as a part to be electrically coupled, on the one-to-one basis, to the individual chips 211A through a wire 216. Out of each of the plurality of connection terminals 213C, the part embedded in the support substrate 213A may serve as, for example, a part to be electrically coupled to all the chips 211A through the support substrate 213A and the sub-mount 215. The terminals α may be supported by the insulating through-holes provided in the support substrate 213A and the outer frame substrate 213B, and insulated and isolated from the support substrate 213A and the outer frame substrate 213B by the through-holes. Further, the individual terminals α may be insulated and isolated from one another by the above-described insulating members. Moreover, the terminals β may be supported by the conductive through-holes provided in the support substrate 213A and the outer frame substrate 213B, and electrically coupled to the through-holes.

The cap 214 may seal the solid-state light-emitting device 211. The cap 214 may include, for example, a tubular part 214A provided with apertures on a top end and a bottom end. The bottom end of the tubular part 214A may be, for example, in contact with a side surface of the support substrate 213A. The solid-state light-emitting device 211 may be located in an internal space of the tubular part 214A. The cap 214 may have a light transmission window 214B that is disposed to block the aperture on top-end side of the tubular part 214A. The light transmission window 214B may be disposed at a position facing a light-output surface of the solid-state light-emitting device 211, and have a function of transmitting light outputted from the solid-state light-emitting device 211.

As described above, in a case where the chip 211A includes a device of edge-emitting type, the solid-state light-emitting device 211 may emit light from a light-output region that includes a single or a plurality of dot-like emitting spots, or a single or a plurality of non-dot-like emitting spots. The solid-state light-emitting device 211 may include, for example, a single chip 211A that emits light in a predetermined wavelength band. Alternatively, the solid-state light-emitting device 211 may include the plurality of chips 211A that emit light in a same wavelength band. In another alternative, the solid-state light-emitting device 211 may include the plurality of chips 211A that emit light in different wavelength bands. When the solid-state light-emitting device 211 includes the plurality of chips 211A, the chips 211A may be disposed in line in a horizontal direction, for example, as illustrated in FIGS. 16 and 17.

When the solid-state light-emitting device 211 includes the single chip 211A, a size ($W_V \times W_H$) specified as the solid-state light-emitting device 211 may be equal to a size ($W_{V1} \times W_{H1}$) of the single chip 211A, for example, as illustrated in FIG. 19. However, for example, as illustrated in FIG. 20, when the solid-state light-emitting device 211 adopts a monolithic structure, the size may be as follows. That is, in the example illustrated in FIG. 20, the size ($W_V \times W_H$) specified as the solid-state light-emitting device 211 may be $W_{V1} \times 2W_{H1}$ or more. In contrast, when the solid-state light-emitting device 211 includes the plurality of chips 211A, the size specified as the solid-state light-emitting device 211 may be equal to a size measured with all the chips 211A lumped together, for example, as illustrated in FIG. 17. When the plurality of chips 211A are disposed in line in the horizontal direction, the size ($W_V \times W_H$) specified as the solid-state light-emitting device 211 may be $W_{V1} \times 3W_{H1}$ or more in the example of FIG. 17.

2.7 Seventh Modification Example

In the forgoing, the description is provided on examples where the infrared light $L_{IR}$ that may serve as the noise component is reduced by reflection or transmission as the optical property of the optical members for illumination. However, one or two or more of the plurality of optical members for illumination may have property of absorbing the infrared light $L_{IR}$. For example, one or two or more of the coupling lenses 12B, 12G, and 12R, the condenser lenses 161 to 164, the fly-eye lenses 151 and 152, and the driving optical element 14 may have the property of transmitting the blue light $L_B$, the green light $L_G$, and the red light $L_R$, and absorbing the infrared light $L_{IR}$. Further, one or two or more of the mirror 18, the first dichroic prism 131, and the second dichroic prism 132 may have the property of absorbing the infrared light $L_{IR}$.

Alternatively, all of the plurality of optical members for illumination may have the property of reducing the infrared light $L_{IR}$ by reflection, transmission, or absorption.

Even if an order of combining the optical paths of the blue laser 11B, the green laser 11G, and the red laser 11R is changed, various example embodiments as described above allow for the reduction in the infrared light $L_{IR}$.

2.8 Other Modification Examples

In the illuminating unit 1 in the configuration illustrated in FIG. 1, either the first fly-eye lens 151 or the second fly-eye lens 152 may be provided. When only the second fly-eye lens 152 is provided, the first condenser lens 161 and the second condenser lens 162 become unnecessary. When only the first fly-eye lens 151 is provided, the third condenser lens 163 and the fourth condenser lens 164 become unnecessary.

Further, when sufficiently optimal polarization characteristics are obtained, the polarizer 25S used in the configuration illustrated in FIG. 1 may be omitted.

Moreover, the technology may be also applicable to a projector of a digital mirror device method.

In addition, the infrared-band light is taken as an example of the detection light L2 and the noise component thereof. However, ultraviolet-band light may exemplify the detection light L2 and the noise component thereof.

3. OTHER EXAMPLE EMBODIMENTS

The technology according to the disclosure is not limited to the above-described example embodiments and modification examples, but various modifications may be made.

For example, the technology may be configured as follows.

(1)

A projection display apparatus, including:

a light valve that modulates illuminating light on a basis of image data to output the modulated light;

an illuminating unit including a light source, and a plurality of optical members for illumination that generate the illuminating light on a basis of light from the light source to guide the illuminating light to the light valve;

a projection lens that projects the modulated light from the light valve on a projection surface, and allows detection light to enter from a direction opposite to a travelling direction of the modulated light; and an imaging device that is disposed at a location optically conjugated with the light valve, and allows the detection light to enter through the projection lens, one or more of the plurality of optical members for illumination having optical property of reducing a noise component, the noise component affecting the detection light and arising inside the illuminating unit.

(2)

The projection display apparatus according to (1), wherein the one or more of the plurality of optical members for illumination have the optical property of reducing the noise component by absorption, reflection, or transmission.

(3)

The projection display apparatus according to (1) or (2), wherein the light source includes a plurality of light sources that are disposed on different optical paths, the plurality of optical members for illumination include an optical path combination element that combines two or more of the optical paths on which respective two or more light sources of the plurality of light sources are disposed, and the optical path combination element has the optical property of reducing the noise component.

(4)

The projection display apparatus according to (3), wherein the optical path combination element has optical property of causing reflection or transmission of the noise component in a direction deviated from an optical path of the illuminating light.

(5)

The projection display apparatus according to any one of (1) to (4), wherein the plurality of optical members for illumination include a mirror that bends an optical path of the illuminating light, and the mirror has the optical property of reducing the noise component.

(6) The projection display apparatus according to (5), wherein the mirror has optical property of transmitting the noise component in a direction deviated from the optical path of the illuminating light.

(7) The projection display apparatus according to any one of (1) to (6), further including an absorber that is disposed in a direction deviated from an optical path of the illuminating light and absorbs the noise component, wherein
the one or more of the plurality of optical members for illumination have optical property of guiding the noise component in the direction deviated from the optical path of the illuminating light by reflection or transmission.

(8) The projection display apparatus according to any one of (1) to (7), wherein the noise component includes light of an invisible light band.

(9) The projection display apparatus according to any one of (1) to (8), wherein the noise component includes light of an infrared light band.

(10) The projection display apparatus according to any one of (1) to (9), wherein the noise component includes light of a same wavelength band, as the detection light.

(11) The projection display apparatus according to any one of (1) to (10), wherein the noise component is a component included in the light generated from the light source.

(12) The projection display apparatus according to any one of (1) to (11), further including an image processor that detects, on a basis of a result of imaging by the imaging device, a position of a feature point of an object on the projection surface or in vicinity of the projection surface by making the position correspond to coordinates of a projection image projected on the projection surface.

(13) The projection display apparatus according to any one of (1) to (12), further including a light source unit for detection that emits invisible light for detection at a predetermined height from the projection surface, wherein
the imaging device allows the invisible light diffused by hitting an object, as the detection light, to enter through the projection lens.

(14) The projection display apparatus according to (13), wherein the light source unit for detection emits infrared light as the invisible light for detection.

(15) The projection display apparatus according to any one of (1) to (14), further including a light source unit for detection that emits invisible light for detection, to provide coverage of at least a projection area on the projection surface with the invisible light for detection from a predetermined height, the projection area being an area projected by the projection lens, wherein
the imaging device allows the invisible light diffused by hitting an object in vicinity of the projection area, as the detection light, to enter through the projection lens.

It should be understood by those skilled in the art that various modifications, combinations, sub-combinations, and alterations may occur depending on design requirements and other factors insofar as they are within the scope of the appended claims or the equivalents thereof.

The invention claimed is:

1. A projection display apparatus, comprising:
a first light source configured to generate light;
a projection lens;
a light valve; and
a plurality of optical members configured to:
receive the light from the first light source;
generate illuminating light based on the light received by the plurality of optical members; and
guide the illuminating light to the light valve, wherein
the projection lens is configured to:
project the illuminating light from the light valve to a projection surface; and
allow detection light to enter from a first direction opposite to a second direction of the projected illuminating light, and
wherein the plurality of optical members is further configured to reduce a noise component which affects the detection light.

2. The projection display apparatus according to claim 1, wherein the plurality of optical members is further configured to guide the illuminating light from the first light source to the light valve.

3. The projection display apparatus according to claim 2, wherein the plurality of optical members is further configured to reduce the noise component based on one of absorption, reflection, or transmission.

4. The projection display apparatus according to claim 2, wherein
the plurality of optical members includes a mirror, and
the mirror is configured to:
bend an optical path of the illuminating light, and
reduce the noise component.

5. The projection display apparatus according to claim 2, wherein the mirror is further configured to transmit the noise component in a third direction different from the optical path of the illuminating light.

6. The projection display apparatus according to claim 1, wherein the light valve is configured to modulate the illuminating light based on image data.

7. The projection display apparatus according to claim 1, further comprising an imaging sensor, wherein the imaging sensor is configured to:
detect the illuminating light from the projection lens; and
allow the detection light to enter via the projection lens.

8. The projection display apparatus according to claim 1, wherein
the first light source includes a plurality of light sources,
each of the plurality of light sources is on a corresponding optical path of a plurality of optical paths,
the plurality of optical members includes a prism,
the prism is configured to:
combine at least two optical paths of the plurality of optical paths based on a presence of at least two light sources of the plurality of light sources on the at least two optical paths; and
reduce the noise component.

9. The projection display apparatus according to claim 8, wherein
the prism is further configured to one of reflect or transmit the noise component in a third direction different from an optical path of the illuminating light.

10. The projection display apparatus according to claim 1, further comprising an absorber in a third direction different from an optical path of the illuminating light, wherein the absorber is configured to absorb the noise component, and at least one optical member of the plurality of optical members is configured to guide the noise component the third direction different from the optical path of the illuminating light based on one of reflection or transmission.

11. The projection display apparatus according to claim 10, wherein the noise component includes light of an invisible light band.

12. The projection display apparatus according to claim 10, wherein the noise component includes light of an infrared light band.

13. The projection display apparatus according to claim 10, wherein a wavelength band of the noise component and a wavelength band of the detection light is same.

14. The projection display apparatus according to claim 10, wherein the light from the first light source includes the noise component.

15. The projection display apparatus according to claim 1, further comprising:
  an imaging sensor configured to execute an imaging operation on the projection surface; and
  an image processor configured to detect, based on the imaging operation, a position of a feature point of an object on one of the projection surface or in vicinity of the projection surface, wherein the position corresponds to coordinates of a projection image projected on the projection surface.

16. The projection display apparatus according to claim 1, further comprising:
  an imaging sensor; and
  a second light source configured to emit invisible light at a specific height from the projection surface, wherein
    the imaging sensor is configured to diffuse the invisible light via the projection lens,
    the invisible light is diffused based on a hitting operation on an object, and
    the invisible light is diffused as the detection light.

17. The projection display apparatus according to claim 16, wherein the second light source is further configured to emit infrared light as the invisible light for detection of the object.

18. The projection display apparatus according to claim 1, further comprising:
  an imaging sensor; and
  a second light source configured to emit invisible light for detection of an object from a height, wherein
    the emitted invisible light covers at least a part of a projection area on the projection surface,
    the projection lens is configured to project projection area,
    the imaging sensor is configured to diffuse the invisible light via the projection lens as the detection light, and
    the invisible light is diffused based on a hitting operation on the object in vicinity of the projection area.

19. The projection display apparatus according to claim 1, further comprising an imaging sensor, wherein the imaging sensor is at a first location that is optically conjugated with a second location of the light valve.

* * * * *